US011269488B2

(12) United States Patent
Ham et al.

(10) Patent No.: US 11,269,488 B2
(45) Date of Patent: Mar. 8, 2022

(54) SYSTEM FOR PROVIDING APPLICATION LIST AND METHOD THEREFOR

(71) Applicant: SAMSUNG ELECTRONICS CO., LTD., Suwon-si (KR)

(72) Inventors: Myung-joo Ham, Seoul (KR); Geun-sik Lim, Seoul (KR); Dong-yun Jin, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/751,303

(22) PCT Filed: Aug. 9, 2016

(86) PCT No.: PCT/KR2016/008738
§ 371 (c)(1),
(2) Date: Feb. 8, 2018

(87) PCT Pub. No.: WO2017/034180
PCT Pub. Date: Mar. 2, 2017

(65) Prior Publication Data
US 2018/0232113 A1    Aug. 16, 2018

(30) Foreign Application Priority Data

Aug. 25, 2015 (KR) .................. 10-2015-0119820

(51) Int. Cl.
*G06F 3/0482*        (2013.01)
*G06F 9/44*          (2018.01)
(Continued)

(52) U.S. Cl.
CPC .......... *G06F 3/0482* (2013.01); *G06F 1/32* (2013.01); *G06F 1/329* (2013.01); *G06F 9/44* (2013.01);
(Continued)

(58) Field of Classification Search
CPC ...................................... G06F 3/0482
(Continued)

(56) References Cited

U.S. PATENT DOCUMENTS 6,230,204 B1 *   5/2001   Fleming, III   ....... G06F 11/3414
                                                       709/224
8,538,484 B2     9/2013   Chan et al.
(Continued)

FOREIGN PATENT DOCUMENTS

CN    102298542    12/2011
CN    103177086    6/2013
(Continued)

OTHER PUBLICATIONS

Chen et al., Smartphone Energy Drain in the Wild: Analysis and Implications, available at https://engineering.purdue.edu/~ychu/publications/TR-ECE-15-03.pdf (published Mar. 1, 2015).*

(Continued)

*Primary Examiner* — Sherief Badawi
*Assistant Examiner* — Conrad R Pack
(74) *Attorney, Agent, or Firm* — Nixon & Vanderhye, P.C.

(57) ABSTRACT

Provided is a method, performed by an electronic apparatus, of displaying an application list, the method including: requesting a server for an application list including an identification value of at least one application downloadable by the electronic apparatus; receiving, from the server, the application list including a graphic interface indicating a power consumption grade of the at least one application; and displaying the application list.

13 Claims, 29 Drawing Sheets

(51) Int. Cl.
    *G06F 15/16*     (2006.01)
    *G06F 9/48*     (2006.01)
    *G06F 1/32*     (2019.01)
    *G06F 1/329*     (2019.01)

(52) U.S. Cl.
    CPC ............ *G06F 9/4893* (2013.01); *G06F 15/16* (2013.01); *Y02D 10/00* (2018.01)

(58) Field of Classification Search
    USPC ........................................................ 715/810
    See application file for complete search history.

(56) References Cited

U.S. PATENT DOCUMENTS

| | | | |
|---|---|---|---|
| 8,566,048 | B2 | 10/2013 | Kim et al. |
| 9,223,366 | B2 | 12/2015 | Kida et al. |
| 10,091,322 | B2 | 10/2018 | O'Donoghue et al. |
| 2008/0082851 | A1* | 4/2008 | Zettler ............... H04W 52/0264 713/340 |
| 2011/0072378 | A1* | 3/2011 | Nurminen ............. G06F 9/5094 715/771 |
| 2011/0098953 | A1* | 4/2011 | Jonsson .................. G01D 4/002 702/62 |
| 2011/0296418 | A1* | 12/2011 | Kim .................... G06F 3/04842 718/100 |
| 2012/0134517 | A1 | 5/2012 | Sato |
| 2013/0042122 | A1 | 2/2013 | Hackborn et al. |
| 2013/0152002 | A1* | 6/2013 | Menczel ............... G06F 3/0488 715/765 |
| 2013/0191541 | A1* | 7/2013 | Kishan ................. G06F 15/173 709/226 |
| 2013/0254880 | A1 | 9/2013 | Alperovitch et al. |
| 2014/0129686 | A1 | 5/2014 | Haemel et al. |
| 2014/0157387 | A1 | 6/2014 | Lee et al. |
| 2014/0181973 | A1 | 6/2014 | Lee et al. |
| 2014/0200991 | A1 | 7/2014 | Wu et al. |
| 2014/0250015 | A1* | 9/2014 | Lemay ...................... G06F 8/61 705/44 |
| 2014/0325481 | A1* | 10/2014 | Pillai ................... G06F 11/3409 717/124 |
| 2015/0026487 | A1* | 1/2015 | Choi ..................... G06F 9/4893 713/300 |
| 2015/0169029 | A1* | 6/2015 | Tian ...................... G06F 1/3218 713/300 |

FOREIGN PATENT DOCUMENTS

| | | |
|---|---|---|
| CN | 104063304 | 9/2014 |
| CN | 104067305 | 9/2014 |
| JP | 2012-063917 | 3/2012 |
| JP | 2012-068803 | 4/2012 |
| JP | 2013-257680 | 12/2013 |
| KR | 10-1477179 | 12/2014 |
| WO | 2011/020060 | 2/2011 |

OTHER PUBLICATIONS

Extended European Search Report dated Jun. 20, 2018 in counterpart European Patent Application No. 16839469.0.
International Search Report for PCT/KR2016/008738, dated Nov. 10, 2016, 4 pages.
First Office Action dated Sep. 1, 2020 in counterpart Chinese Patent Application No. 201680049324.1 and English-language translation.
English-language machine translation of JP102298542.
Examination Report dated May 10, 2021 in counterpart Indian Patent Application No. 201827004536 and English-language translation.
Notification of Second Office Action dated May 20, 2021 in counterpart Chinese Patent Application No. 201680049324.1 and English-language translation.
Notice of Non-Final Rejection dated Jun. 23, 2021 in counterpart Korean Patent Application No. 10-2015-0119820 and English-language translation.
Notification of Third Office Action dated Aug. 6, 2021 in counterpart Chinese Patent Application No. 201680049324.1 and English-language translation.
Notice of Allowance dated Dec. 22, 2021 in counterpart Korean Patent Application No. 10-2015-0119820 and English-language translation.
Rejection Decision dated Jan. 13, 2022 in counterpart Chinese Patent Application No. 201680049324.1 and English-language translation.

* cited by examiner

FIG. 4

401 — Foreground { (CPU aW), (GPU bW), (Bluetooth cW), (Wi-Fi ⋯,) (GPS ⋯.), (File System dW), (Display eW), ⋯ }

Background { ⋯ }

402 — Foreground { (CPU n cycles), (GPU m cycles), (Bluetooth x packets @ AA mode, y packets @ BB mode), (Wi-Fi ⋯,) (GPS ⋯.) , (File System i writes, j reads), (Display k seconds @ brightness CC), ⋯ }

Background { ⋯ }

403 — Foreground { total fW}, Background { total gW}

FIG. 5A

| ID VALUE OF APPLICATION | CPU | GPU | Network | Memory | Display | ... |
|---|---|---|---|---|---|---|
| FIRST APPLICATION | 52W | 40W | 10W | 60W | 30W | |
| SECOND APPLICATION | 30W | 70W | – | 50W | 30W | |
| THIRD APPLICATION | 80W | 15W | 30W | 90W | 70W | |
| FOURTH APPLICATION | 110W | 150W | 10W | 80W | 50W | |
| ... | | | | | | |
| N-TH APPLICATION | aW | bW | cW | dW | eW | |

(POWER CONSUMPTION : W)

FIG. 8

| ID VALUE OF APPLICATION | CPU | GPU | Network | Memory | Display | ... |
|---|---|---|---|---|---|---|
| FIRST APPLICATION | 52W | 40W | 10W | 60W | 30W | |
| SECOND APPLICATION | 30W | 70W | - | 50W | 30W | |
| THIRD APPLICATION | 80W | 15W | 30W | 90W | 70W | |
| FOURTH APPLICATION | 110W | - | 10W | 80W | 50W | |
| ... | | | | | | |
| TENTH APPLICATION | 120W | 20W | 30W | 50W | 100W | |

POWER CONSUMPTION OF FIRST APPLICATION

= (POWER CONSUMPTION OF CPU)*(WEIGHT 1) + (POWER CONSUMPTION OF GPU)*(WEIGHT 0) + (POWER CONSUMPTION OF NETWORK)*(WEIGHT 1) + (POWER CONSUMPTION OF DISPLAY)*(WEIGHT 1) + ······

(POWER CONSUMPTION : W)

| ID VALUE OF APPLICATION | POWER CONSUMPTION OF APPLICATION |
|---|---|
| FIRST APPLICATION | 150W |
| SECOND APPLICATION | 180W |
| THIRD APPLICATION | 210W |
| FOURTH APPLICATION | 250W |
| ... | |
| N-TH APPLICATION | 310W |

FIRST GROUP (910): FIRST APPLICATION, SECOND APPLICATION
SECOND GROUP (920): THIRD APPLICATION, FOURTH APPLICATION (POWER CONSUMPTION : W)

FIG. 11

| ID VALUE OF APPLICATION | DEVICE INFORMATION | CPU | GPU | NETWORK | MEMORY | ... |
|---|---|---|---|---|---|---|
| FIRST APPLICATION | FIRST MODEL | 110W | – | 10W | 60W | |
| | SECOND MODEL | 30W | 70W | 10W | 50W | |
| | ... | | | ... | | |
| SECOND APPLICATION | FIRST MODEL | 100W | – | 10W | 50W | |
| | SECOND MODEL | 80W | 15W | 30W | 90W | |
| | ... | | | ... | | |
| THIRD APPLICATION | FIRST MODEL | 90W | – | 30W | 90W | |
| | SECOND MODEL | 80W | 15W | 30W | 90W | |
| | ... | | | ... | | |

(POWER CONSUMPTION : W)

FIG. 15

| ID VALUE OF APPLICATION | USER INFORMATION | CPU | GPU | NETWORK | MEMORY | ... |
|---|---|---|---|---|---|---|
| FIRST APPLICATION | FIRST SIMILAR USER INFORMATION GROUP (1510) | 51W | 40W | 10W | 60W | ... |
|  | SECOND SIMILAR USER INFORMATION GROUP | 30W | 70W | 10W | 50W |  |
|  | ⋮ | ⋮ | ⋮ | ⋮ | ⋮ | ⋮ |
| SECOND APPLICATION | FIRST SIMILAR USER INFORMATION GROUP (1520) | 30W | 70W | 10W | 50W | ... |
|  | SECOND SIMILAR USER INFORMATION GROUP | 80W | 15W | 30W | 90W |  |
|  | ⋮ | ⋮ | ⋮ | ⋮ | ⋮ | ⋮ |
| THIRD APPLICATION | FIRST SIMILAR USER INFORMATION GROUP | 80W | 15W | 30W | 90W | ... |
|  | SECOND SIMILAR USER INFORMATION GROUP | 80W | 15W | 30W | 90W |  |
|  | ⋮ | ⋮ | ⋮ | ⋮ | ⋮ | ⋮ |

(POWER CONSUMPTION : W)

FIRST USER INFORMATION GROUP = { (AGE, TEENAGER), (GENDER, FEMALE), (OCCUPATION, STUDENT) }
SECOND USER INFORMATION GROUP = { (AGE, TWENTIES), (GENDER, FEMALE), (OCCUPATION, OFFICE WORKER) }
......

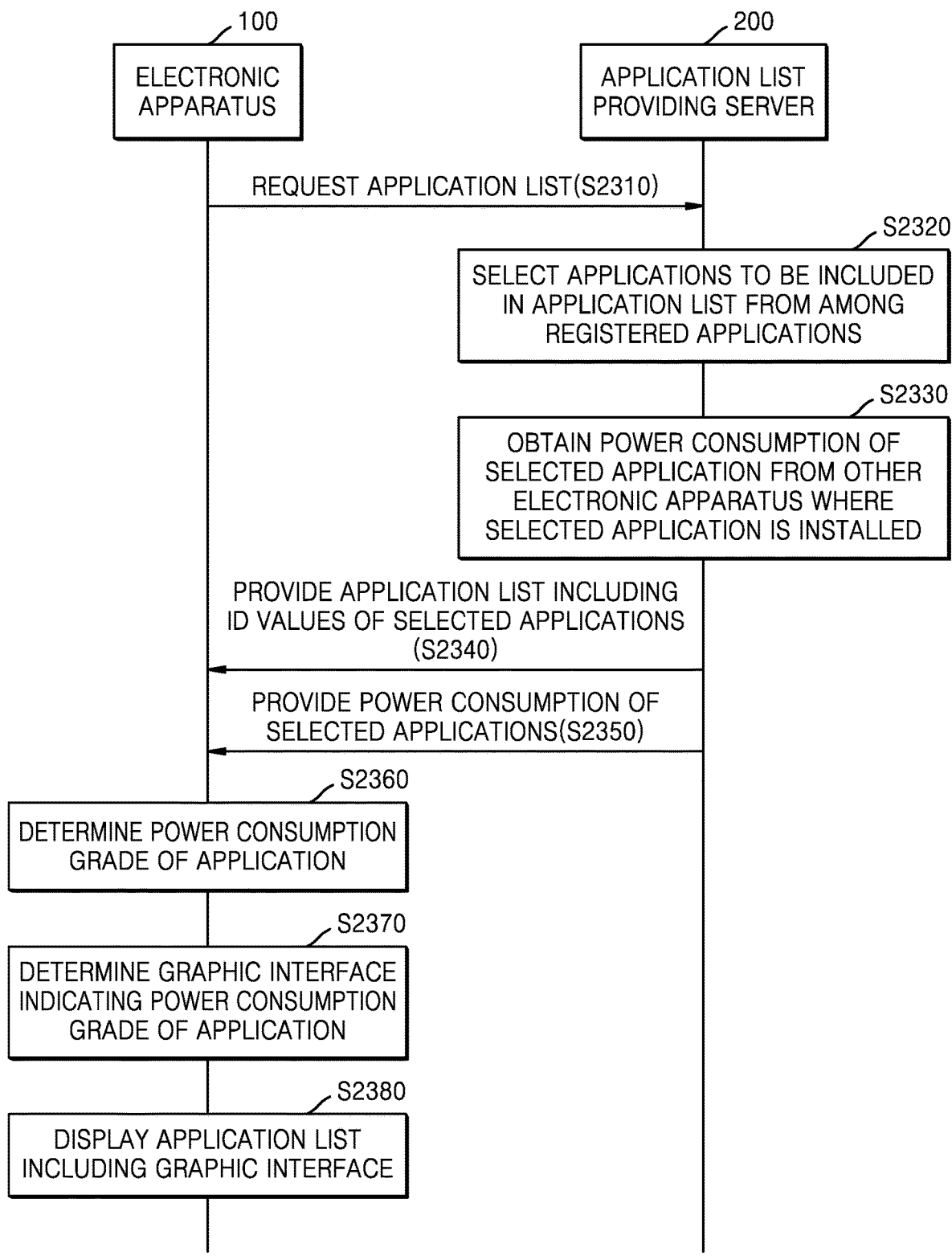

SYSTEM FOR PROVIDING APPLICATION LIST AND METHOD THEREFOR

CROSS-REFERENCE TO RELATED APPLICATIONS

This application is the U.S. national phase of International Application No. PCT/KR2016/008738 filed 9 Aug. 2016, which designated the U.S. and claims priority to KR Patent Application No. 10-2015-0119820 filed 25 Aug. 2015, the entire contents of each of which are hereby incorporated by reference.

TECHNICAL FIELD

The present disclosure relates to a system and method of providing an application list. More particularly, the present disclosure relates to a system and method of providing an application list including identification (ID) values of applications downloadable by an electronic apparatus.

BACKGROUND AND SUMMARY

With increasing user needs with respect to portable devices, software platforms for the portable devices are quickly becoming more complex. In addition, with the increasing user needs with respect to the portable devices, hardware components included in the portable devices are diversifying. However, compared to such user needs, battery capacities or heat tolerance limits do not satisfy the user needs. Accordingly, power management for reducing power consumption is continuously studied.

As applications developed by third parties are operated in portable devices, manufacturers are restricted from controlling power consumption by using software platforms, etc. In this regard, there is an increasing necessity for methods and apparatuses for inducing users to install low-power applications and inducing application developers to develop low-power applications.

Provided is an operating method of an electronic apparatus that requests a server for an application list including an identification (ID) value of at least one application downloadable by the electronic apparatus, receives, from the server, an application list including power consumption grades of applications, and displays the application list including a graphic interface indicating the power consumption grades such that a user of the electronic apparatus intuitively perceives power consumption of each of the applications.

BRIEF DESCRIPTION OF THE DRAWINGS

FIG. 4 is a diagram for describing power consumption of an application obtained by an application list providing server from other electronic apparatuses, according to some embodiments.

FIGS. 5A and 5B are diagrams for describing a method, performed by an application list providing server, of storing and/or managing componentwise power consumption of an application, according to some embodiments.

FIG. 8 is a diagram for describing a method, performed by an application list providing server, of calculating power consumption of an application, according to some embodiments.

FIG. 11 is a diagram for describing a method, performed by an application list providing server, of storing and/or managing componentwise power consumption of an application, according to some embodiments.

FIG. 15 is a diagram for describing a method, performed by an application list providing server, of storing and/or managing componentwise power consumption of an application including user information from another electronic apparatus, according to some embodiments.

FIG. 23 is a diagram for describing a method, performed by an electronic apparatus, of determining a power consumption grade of an application, according to some embodiments.

DETAILED DESCRIPTION OF EXAMPLE EMBODIMENT

Figure 1:
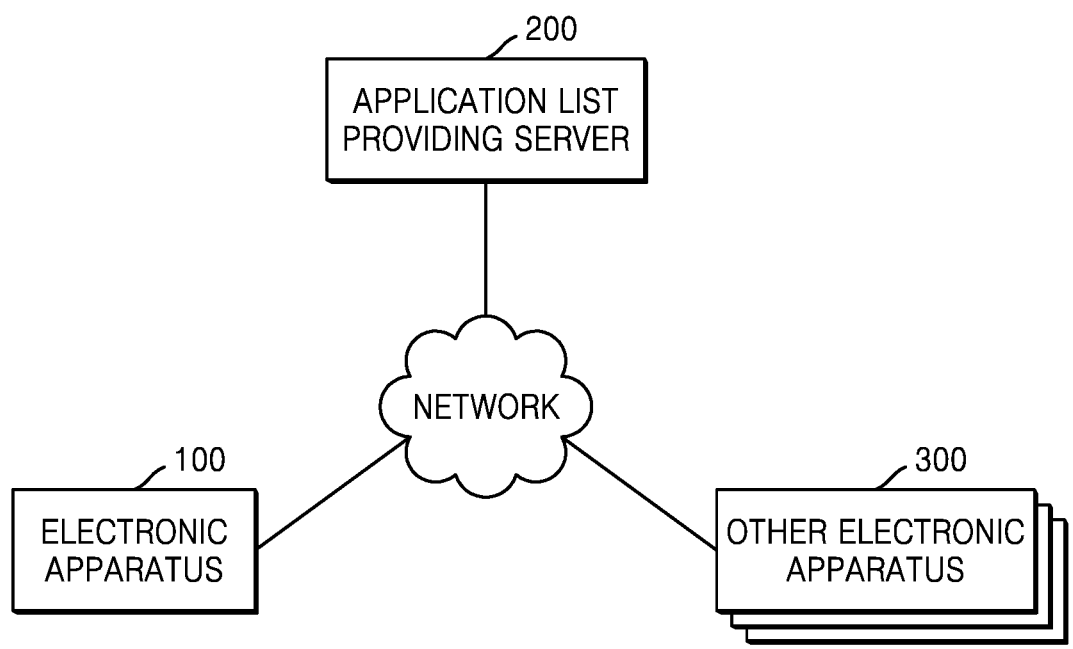
FIG. 1 is a schematic diagram of an application list providing system according to some embodiments.

In accordance with a first aspect of the present disclosure, a method, performed by an electronic apparatus, of displaying an application list, the method includes: requesting a server for an application list including an identification value of at least one application downloadable by the electronic apparatus; receiving the application list including a power consumption grade of the at least one application from the server; and displaying the application list comprising a graphic interface indicating the power consumption grade.

Also, the requesting the server for the application list may include providing device information of the electronic device to the server.

Also, the power consumption grade of the at least one application may be determined based on power consumption of the at least one application, the power consumption obtained by the server from another at least one electronic apparatus based on the device information, wherein the power consumption of the at least one application may be total power consumption determined based on power consumed per component included in the other at least one electronic apparatus to execute the at least one application.

Also, the power consumption of the at least one application may be determined based on at least one of power consumed by a central processing unit (CPU), power consumed by a graphic processing unit (GPU), power consumed by a memory, and power consumed during a network communication process of the other at least one electronic apparatus to execute the at least one application.

Also, the other at least one electronic apparatus has a same product name as the electronic apparatus.

Also, the requesting the server for the application list may further include providing information about an application estimated usage time to the server.

Also, the power consumption grade of the at least one application may be determined based on power consumption of the at least one application for the application estimated usage time.

Also, the requesting the server for the application list may further include providing user information of the electronic apparatus, wherein the user information may include at least one of an age, a gender, and an occupation of a user.

Also, a user of the other at least one electronic apparatus may have same or similar user information as the user of the electronic apparatus.

Also, the power consumption grade of the at least one application may be determined based on power consumption of the at least one application obtained by the server from the other at least one electronic apparatus, wherein the power consumption of the at least one application may be total power consumption determined based on power consumed by the other at least one electronic apparatus per task of the at least one application.

Also, the graphic interface may include at least one of an image, text, and animation distinguished based on the power consumption grade of the at least one application.

Also, the graphic interface may determine at least one of a color, brightness, chroma, and size of an object indicating the identification value of the at least one application in the application list, based on the power consumption grade of the at least one application.

Also, the graphic interface may determine a size of an object indicating an identification value of the at least one application in the application list, based on the power consumption grade of the at least one application.

Also, the method may further include: receiving a user input with respect to the graphic interface indicating the power consumption grade of the at least one application in the application list; and displaying detailed information regarding the power consumption grade of the at least one application in response to the user input.

In accordance with a second aspect of the present disclosure, a method, performed by a server, of providing an application list, the method includes: receiving, from an electronic apparatus, a request to provide an application list including an identification value of at least one application downloadable by the electronic apparatus; obtaining power consumption of the at least one application from another electronic apparatus where the at least one application is installed; determining a power consumption grade of the at least one application based on the power consumption of the at least one application; and providing, to the electronic apparatus, the application list including the power consumption grade of the at least one application.

Also, the power consumption of the at least one application may be total power consumption determined based on power consumed per component included in the electronic apparatus.

Also, the obtaining of the power consumption of the at least one application may include obtaining at least one of power consumed by a central processing unit (CPU), power consumed by a graphic processing unit (GPU), power consumed by a memory, and power consumed during a network communication process of another electronic apparatus to execute the at least one application.

Also, the receiving of the request may include obtaining, from the electronic apparatus, a product name of the electronic apparatus.

Also, the determining of the power consumption grade may include: assigning a weight per component; calculating the power consumption of the at least one application based on the weight; and determining the power consumption grade of the at least one application based on the calculated power consumption.

Also, the other electronic apparatus may have a same product name as the electronic apparatus.

Also, the receiving of the request may further include obtaining, from the electronic apparatus, information about an application estimated usage time.

Also, the determining of the power consumption grade may include determining the power consumption grade of the at least one application based on power consumption of the at least one application for the application estimated usage time.

Also, the receiving of the request may further include obtaining user information of a user of the electronic apparatus, wherein the user information may include at least one of an age, a gender, and an occupation of the user.

Also, the other electronic apparatus may have same or similar user information as the electronic apparatus.

Also, the power consumption of the at least one application may be total power consumption determined based on power consumed by the other electronic apparatus per task of the at least one application.

In accordance with a third aspect of the present disclosure, an electronic apparatus includes: a communication unit configured to request a server for an application list including an identification value of at least one downloadable application, and receive the application list including a power consumption grade of the at least one application from the server; and a controller configured to control the application list to be displayed on a screen.

Also, the communication unit may be further configured to transmit a product name of the electronic apparatus to the server.

Also, the power consumption grade of the at least one application may be determined based on power consumption of the at least one application obtained by the server from another at least one electronic apparatus based on the product name, wherein the power consumption of the at least one application may be total power consumption determined based on power consumed per component included in the other at least one electronic apparatus to execute the at least one application.

Also, the other at least one electronic apparatus may have a same product name as the electronic apparatus.

Also, the communication unit may be further configured to transmit information about an application estimated usage time to the server.

Also, the power consumption grade of the at least one application may be determined based on power consumption of the at least one application for the application estimated usage time.

Also, the communication unit may be further configured to transmit user information of the electronic apparatus, wherein the user information may include at least one of an age, a gender, and an occupation of a user.

Also, a user of the other at least one electronic apparatus may have same or similar user information as the user of the electronic apparatus.

Also, the power consumption grade of the at least one application may be determined based on power consumption of the at least one application, the power consumption obtained by the server from the other at least one electronic apparatus, wherein the power consumption of the at least one application may be total power consumption determined based on power consumed by the other at least one apparatus per task of the at least one application.

Also, the graphic interface may include at least one of an image, text, and animation distinguished based on the power consumption grade of the at least one application.

Also, the graphic interface may determine at least one of a color, brightness, chroma, and size of an object indicating the identification value of the at least one application in the application list, based on the power consumption grade of the at least one application.

Also, the graphic interface may determine a size of an object indicating the identification value of the at least one application in the application list, based on the power consumption grade of the at least one application.

Also, the electronic apparatus may further include an input unit configured to receive a user input with respect to the graphic interface indicating the power consumption grade of the at least one application in the application list, wherein the controller may be further configured to control detailed information regarding the power consumption grade of the at least one application to be displayed on a screen in response to the user input.

In accordance with a fourth aspect of the present disclosure, a server includes: a communication unit configured to receive, from an electronic apparatus, a request to provide an application list including an identification value of at least one application downloadable by the electronic apparatus; and a controller configured to obtain power consumption of the at least one application from another electronic apparatus where the at least one application is installed, determine a power consumption grade of the at least one application based on power consumption of the at least one application, and control the application list including the power consumption grade of the at least one application to be provided to the electronic apparatus.

Also, the power consumption of the at least one application may be total power consumption determined based on power consumed per component included in the electronic apparatus.

Also, the communication unit may be further configured to receive a product name of the electronic apparatus from the electronic apparatus.

Also, the controller may be further configured to assign a weight per component, calculate the power consumption of the at least one application based on the weight, and determine the power consumption grade of the at least one application based on the calculated power consumption.

Also, the other electronic apparatus may have a same product name as the electronic apparatus.

Also, the communication unit may be further configured to receive, from the electronic apparatus, information about an application estimated usage time.

Also, the controller may be further configured to determine the power consumption grade of the at least one application based on power consumption of the at least one application for the application estimated usage time.

Also, the communication unit may be further configured to obtain user information of a user of the electronic apparatus, wherein the user information may include at least one of an age, a gender, and an occupation of the user.

Also, a user of the other electronic apparatus may have same or similar user information as the user of the electronic apparatus.

Also, the power consumption of the at least one application may be total power consumption determined based on power consumed by the other electronic apparatus per task of the at least one application.

In accordance with a fifth aspect of the present disclosure, a non-transitory computer-recording medium has recorded thereon a program which, when executed by a computer, performs the method of the first aspect of the present disclosure.

MODE OF THE DISCLOSURE

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the disclosure. Thus, the terms used herein have to be defined based on the meaning of the terms together with the description throughout the specification.

While such terms as "first", "second", etc., may be used to describe various components, such components must not be limited to the above terms. The above terms are used only to distinguish one component from another. For example, a first component may be referred to as a second component and similarly, a second component may be referred to as a first component without departing from the scope of the disclosure. As used herein, the term "and/or" includes any and all combinations of one or more of the associated listed items.

When a part "includes" or "comprises" an element, unless there is a particular description contrary thereto, the part can further include other elements, not excluding the other elements. Also, the term "unit" in the embodiments of the present disclosure means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

In the present specification, a component may be hardware included in an electronic apparatus. Also, a component may be hardware consuming power provided from a power supply. Also, a component may be a hardware unit pre-set by an application list providing server, from among pieces of hardware included in an electronic apparatus. Examples of a component may include a central processing unit (CPU), a graphics processing unit (GPU), a memory, a network (which may be subdivided into a global positioning system (GPS), Bluetooth, etc), and a display.

Reference will now be made in detail to embodiments, examples of which are illustrated in the accompanying drawings. In this regard, the present embodiments may have different forms and should not be construed as being limited to the descriptions set forth herein. Also, for clarity of description, components that are not significantly related to the embodiments are not shown in the drawings, and like reference numerals refer to like elements throughout the specification.

FIG. 1 is a schematic diagram of an application list providing system according to some embodiments.

Referring to FIG. 1, the application list providing system according to some embodiments may include an electronic apparatus 100, an application list providing server 200, and another at least one electronic apparatus 300.

The electronic apparatus 100 may receive an application list provided by the application list providing server 200 by connecting to the application list providing server 200. Here, the application list may include identification (ID) values of applications downloadable by the electronic apparatus 100. The electronic apparatus 100 may receive the application list including the ID values of the applications recommended by the application list providing server 200. Alternatively, the electronic apparatus 100 may receive an application list including ID values of applications included in a certain category (for example, a game, shopping, etc) from the application list providing server 200. Alternatively, the electronic apparatus 100 may receive an application list including ID values of applications searched for by the application list providing server 200.

The application list received from the application list providing server 200 may include power consumption grades of the applications. Here, the power consumption grade of the application may be an absolute grade determined by the application list providing server 200. Alternatively, the power consumption grades of the applications may be relative grades determined by comparing amounts of power consumption of the applications in the application list. Also, the electronic apparatus 100 may display, on a screen, the application list including a graphic interface indicating the power consumption grades of the applications. For example, the electronic apparatus 100 may display an image, text, animation, or the like indicating the power consumption grade.

The application list providing server 200 may be a cloud server that registers information about applications downloadable from an application developer (or an application developing business operator), and stores and/or manages the registered information about applications. Here, information about a downloadable application may include application download information (for example, an installation file location information), an application name, a category, an icon, a summary, etc., and may further include a developer, a version, a review, etc.

The application list providing server 200 according to some embodiments may enable a user of the electronic apparatus 100 to download and/or install a desired application by providing an application list including information about downloadable applications to the electronic apparatus 100.

Also, the application list providing server 200 may determine the power consumption grades of the applications in the application list. For example, the application list providing server 200 may obtain power consumption of the application from the other at least one electronic apparatus 300 in which the application is pre-installed. The application list providing server 200 may determine the power consumption grade of the application based on actual power consumption obtained from the other electronic apparatus 300.

Alternatively, the application list providing server 200 may pre-set power consumption per electronic apparatus. In this case, the application list providing server 200 may determine the power consumption grade of the application based on the pre-set power consumption per application.

According to some embodiments, the application list providing server 200 may assist the user of the electronic apparatus 100 to select a low-power application by providing the application list including the power consumption grades of the applications to the electronic apparatus 100.

The electronic apparatus 100 may be a smart phone, a tablet personal computer (PC), a PC, a smart television (TV), a portable phone, a personal digital assistant (PDA), a laptop computer, a media player, a micro-server, a global positioning system (GPS) device, an electronic book terminal, a digital broadcasting terminal, a navigation device, a kiosk, an MP3 player, a digital camera, or another mobile or non-mobile computing device, but is not limited thereto. Also, the electronic apparatus 100 may include various apparatuses capable of receiving a touch input, such as an electronic blackboard, a touch table, etc. Also, the electronic apparatus 100 may be a watch, glasses, a hair band, or a ring, which has a communication function and a data processing function. However, an embodiment is not limited thereto, and the electronic apparatus 100 may include any type of device capable of receiving the application list from the application list providing server 200 through a network.

Also, the network may include a local area network (LAN), a wide area network (WAN), a value added network (VA)N, a mobile radio communication network, a satellite communication network, or a combination thereof. The network is a data communication network having a comprehensive meaning, which enables each component forming the network of FIG. 1 to smoothly communicate with each other, and may include a wired Internet, a wireless Internet, and a mobile wireless communication network.

Hereinafter, a method, performed by the application list providing system, of operating the electronic apparatus 100, the application list providing server 200, and the other electronic apparatus 300 is described in detail with reference to FIGS. 2 through 17. Also, a method of displaying the application list on the electronic apparatus 100 is described in detail with reference to FIGS. 18 through 22.

Figure 2:
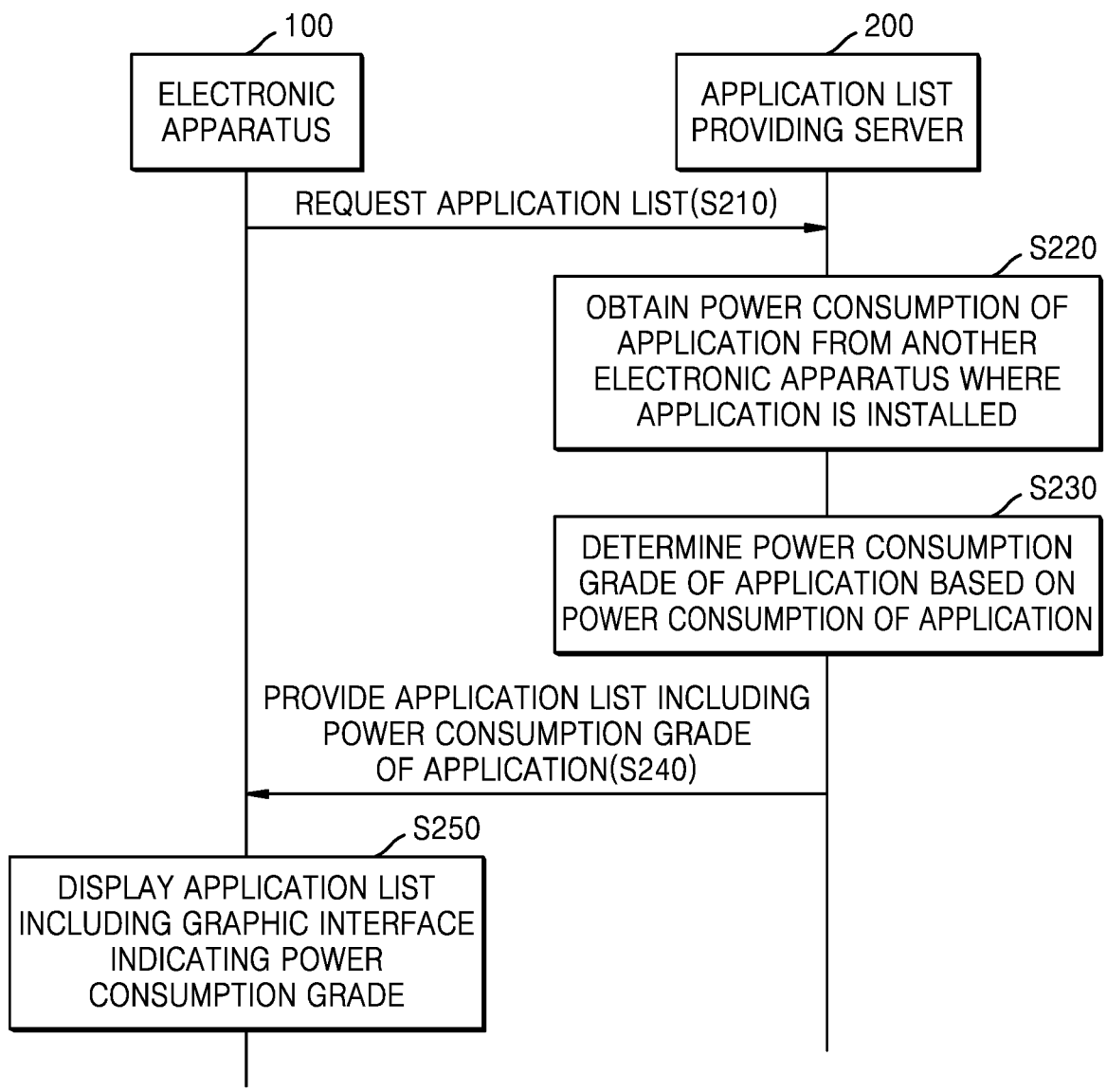
FIG. 2 is a diagram for describing an operating method of an application list system, according to some embodiments.

FIG. 2 is a diagram for describing an operating method of an application list system according to some embodiments.

Referring to FIG. 2, in operation S210, the electronic apparatus 100 may request the application list providing server 200 for an application list including an ID value of at least one application downloadable by the electronic apparatus 100. Hereinafter, for convenience of description, at least one application downloadable by an electronic apparatus will be referred to as a 'downloadable application'. Also, an ID value of an application may include a name, an icon, a category, abstract information, etc. of the application.

For example, when the user of the electronic apparatus 100 executes a certain application (for example, an application store) for downloading an application, the electronic apparatus 100 may request the application list providing server 200 for the application list including the ID values of the downloadable applications. Alternatively, the electronic apparatus 100 may request the application list including the ID values of the downloadable applications corresponding to a certain category selected by the user or corresponding to a search word input by the user. Alternatively, the electronic apparatus 100 may request the application list including the ID values of the downloadable applications recommended by the application list providing server 200 based on preference of the user.

In operation S220, the application list providing server 200 may obtain power consumption of the at least one application from the other at least one electronic apparatus 300 where the at least one application is installed.

The application list providing server 200 according to some embodiments may select an application to be included in the application list from among applications registered in the application list providing server 200, in response to the request for the application list received from the electronic apparatus 100. For example, the application list providing server 200 may select an application that has been downloaded the most by electronic apparatuses using the application list providing server 200. Alternatively, the application list providing server 200 may select an application corresponding to a certain category selected by the user of the electronic apparatus 100 or corresponding to a certain search word input by the user.

Also, the application list providing server 200 may obtain power consumption of the selected application from the other electronic apparatus 300 where the selected application is installed. Here, power consumption of an application may be determined based on componentwise power consumption, that is, power consumed by each component included in the other electronic apparatus 300 to execute the application. Here, a component may be hardware forming an electronic apparatus. Also, a component may be hardware consuming power supplied from a power supply. Also, a component may be a hardware unit pre-set by the application list providing server 200 from among pieces of hardware included in an electronic apparatus. Examples of a component may include a CPU, a GPU, a memory, a network (which may be subdivided into a GPS, Bluetooth, etc), and a display.

Also, power consumed to execute an application may include at least one of power consumed by the other electronic apparatus 300 while preparing to execute the application and power consumed by the other electronic apparatus 300 while executing the application. For example, power consumption of an application may be determined by power consumed by a CPU, power consumed by a GPU, power consumed by a memory, and a power consumed during a network communication process, and power consumed by a display of another electronic apparatus to execute the application.

The application list providing server 200 according to some embodiments may periodically obtain the power consumption of the at least one application from the other electronic apparatus 300. For example, the application list providing server 200 may obtain, from the other electronic apparatus 300, and store power consumed per component to execute an application every 12 hours. Alternatively, the application list providing server 200 may request the other electronic apparatus 300 for power consumption of an application, and obtain power consumption of a certain period of time (for example, one week). Here, obtained power consumption of an application may be average power consumption of a certain period of time.

Alternatively, according to an embodiment, operation S220 may be omitted. For example, the application list providing server 200 may pre-set power consumption of an application. In this case, the application list providing server 200 may obtain the pre-set power consumption of the application instead of obtaining the power consumption of the application from the other electronic apparatus 300.

For example, the application list providing server 200 may store power consumption of an application, which is pre-set according to product names of electronic apparatuses. Also, the application list providing server 200 may obtain pre-stored power consumption of an application corresponding to a product name of the electronic apparatus 100 that requested the application list.

In operation S230, the application list providing server 200 may determine a power consumption grade of the at least one application based on the power consumption of the at least one application obtained from the other electronic apparatus 300.

The application list providing server 200 according to embodiments may classify applications to be included in the application list based on a plurality of power consumption grades so the user may easily perceive the applications with respect to power consumption. For example, the application list providing server 200 may classify the applications into three grades, such as good, fair, and poor. Alternatively, the application list providing server 200 may classify the applications into first through fifth grades. However, an embodiment is not limited thereto, and the applications may be classified by using various power consumption grade units. As such, the application list providing server 200 may provide relative power consumption grades of the applications included in the application list to be provided to the electronic apparatus 100.

In operation S240, the application list providing server 200 may provide the application list including the power consumption grade of the at least one application to the electronic apparatus 100. For example, the application list providing server 200 may provide the application list including a character (for example, first grade, good, or the like), a number (for example, 1, 2, or the like), or a symbol (for example, ! or the like) indicating the power consumption grade of the at least one application.

In operation S250, the electronic apparatus 100 may display the application list received from the application list providing server 200 including a graphic interface indicating the power consumption grade.

In detail, the electronic apparatus 100 may display the application list including an image, text, an animation, or the like indicating the power consumption grade, based on the power consumption grade of the at least one application. Alternatively, the electronic apparatus 100 may differently display colors, chroma, and brightness of objects indicating the ID values of the applications, based on the power consumption grades of the applications. For example, the electronic apparatus 100 may display a name, an icon, or the like of an application in green when a power consumption grade is high, and display a name, an icon, or the like of an application in red when a power consumption grade is low.

Alternatively, the electronic apparatus 100 may vary sizes of the objects indicating the ID values of the applications, based on the power consumption grades of the applications. For example, the electronic apparatus 100 may display a name, an icon, or the like of an application large when a power consumption grade of the application is high, and display a name, an icon, or the like of an application small when a power consumption grade is low.

Alternatively, the electronic apparatus 100 may vary an arrangement of the application list based on the power consumption grades of the applications. For example, the application having a high power consumption grade may be at the top of the application list. As such, the electronic apparatus 100 according to an embodiment may enable the user to select an application having a good power consumption grade by intuitively indicating the power consumption grades of the applications.

Figure 3A:
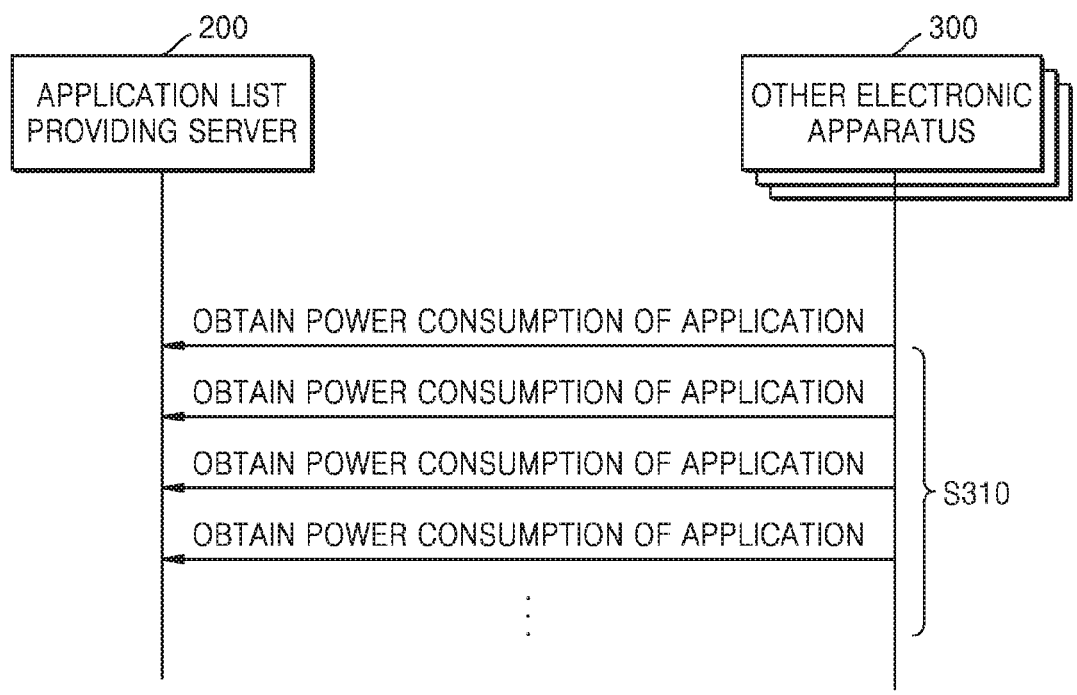
FIGS. 3A and 3B are diagrams for describing a method, performed by an application list providing server, of obtaining power consumption of an application from another electronic apparatus.
Figure 3B:
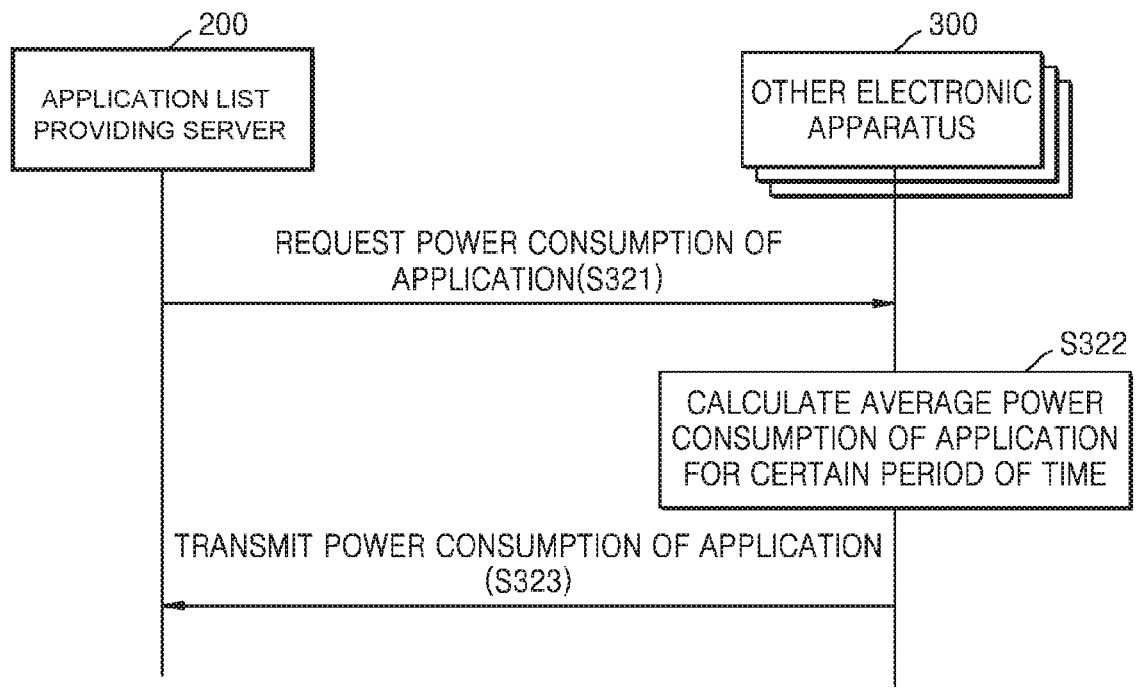

FIGS. 3A and 3B are diagrams for describing a method, performed by an application list providing server, of obtaining power consumption of an application from another electronic apparatus. The application list providing server 200 according to some embodiments may obtain power consumption of applications from the other at least one electronic apparatus 300 where the applications managed by the application list providing server 200 are installed.

Referring to FIG. 3A, the other at least one electronic apparatus 300 may transmit, to the application list providing server 200, the power consumption of the application at regular time intervals, in operation S310. For example, a software platform of the other electronic apparatus 300 may collect power consumed per component for power management. The other electronic apparatus 300 may transmit, to the application list providing server 200, the power consumption collected by the software platform at regular time intervals (for example, 12 hours, 24 hours, or the like).

Alternatively, the other at least one electronic apparatus 300 may transmit, to the application list providing server 200, the power consumption of the application when the other electronic apparatus 300 is in a certain state (for example, a state in which the other electronic apparatus 300 is able to communicate via a network by using Wi-Fi or an idle state of the other electronic apparatus 300).

Referring to FIG. 3B, when a request to provide an application list is received from the electronic apparatus 100 (see operation S210 of FIG. 2), the application list providing server 200 may request the other electronic apparatus 300 for the power consumption of the application, in operation S321. For example, the application list providing server 200 may determine an application to be included in the application list, and request the other electronic apparatus 300 where the determined application is installed for power consumption of the determined application.

In operation S322, the other electronic apparatus 300 may calculate average power consumption of the application for a certain period of time. For example, the software platform of the other electronic apparatus 300 may collect the power consumed per component for power management. Also, the other electronic apparatus 300 may calculate the average power consumption of the application for the certain period of time (for example, 24 hours, 1 week, or the like) based on the collected power consumption.

In operation S323, the other electronic apparatus 300 may transmit the calculated power consumption of the application.

Meanwhile, it is described in FIG. 3B that the other electronic apparatus 300 calculates the average power consumption of the application, but an embodiment is not limited thereto. For example, the other electronic apparatus 300 may calculate power consumption of the application for when the application was most recently executed.

FIG. 4 is a diagram for describing power consumption of an application obtained by an application list providing server from other electronic apparatuses, according to some embodiments.

Referring to FIG. 4, the application list providing server 200 may obtain, according to a pre-determined format, power consumption per component of an application from the other at least one electronic apparatus 300.

According to some embodiments, the other electronic apparatus 300 may transmit, to the application list providing server 200, at least one of power consumption when the application is executed in the foreground and power consumption when the application is executed in the background. Here, the executing of the application in the foreground may mean that the application from among a plurality of applications simultaneously executed by the other electronic apparatus 300 is displayed on a screen. Also, the executing of the application in the background may mean that the application from among the plurality of applications executed by the other electronic apparatus 300 is not displayed on the screen.

Referring to a reference numeral 401 of FIG. 4, the other electronic apparatus 300 may transmit, to the application list providing server 200, power consumption (Watt (W), i.e., power consumption per second) per component included in the other electronic apparatus 300. According to an embodiment, the other electronic apparatus 300 may transmit, to the application list providing server 200, componentwise power consumption by using another unit, for example, Joule (that is, an amount of work or energy used), an amount of consumed power (Wh, i.e., an energy amount consumed when an electric light of 1 W is turned on for 1 hour), or the like.

Alternatively, as indicated by a reference numeral 402, the other electronic apparatus 300 may transmit a componentwise workload to the application list providing server 200. For example, the other electronic apparatus 300 may collect the componentwise workload for executing an application. In detail, the other electronic apparatus 300 may collect a workload of a CPU, a workload of a GPU, a workload of a network, and a workload of a memory. Also, the componentwise workload may be represented in different units based on characteristics of components. In detail, as indicated by the reference numeral 402, the workloads of the CPU and the GPU may be represented in cycle units, and the workload of the network may be represented in exchanged data units (for example, packets, bytes, bits, or the like). Also, the workload of the memory may be represented by the number of times a file system is accessed.

Also, the componentwise workload may include a workload per operation mode (or an operation state) of a component. For example, the workload of the CPU may be indicated as a workload in a first operation mode (for example, 100 MHz), a workload in a second operation mode (for example 200 MHz), or the like. In this case, the application list providing server 200 may use the workload per operation mode so as to compare componentwise workloads collected from different electronic apparatuses. Accordingly, the application list providing server 200 may provide a significant power consumption grade to the user by comparing components manufactured by different manufactures according to operation modes (or operation states) and determining a power consumption grade.

Alternatively, as indicated by a reference numeral 403, the other electronic apparatus 300 may transmit total power consumption of an application to the application list providing server 200.

According to some embodiments, the other electronic apparatus 300 may select one of formats indicated by the reference numerals 401 to 403 based on a processing load. For example, when a processing load is high, the other electronic apparatus 300 may select the format indicated by the reference numeral 403. However, when a processing load is low, the other electronic apparatus 300 may select the format indicated by the reference numeral 401 or 402.

Hereinafter, it is assumed that the application list providing server 200 stores and manages componentwise power consumption of an application according to the format indicated by the reference numeral 401. However, it would be obvious to one of ordinary skill in the art that the application list providing server 200 may store and/or manage a componentwise workload of an application and total power consumption of the application according to the formats indicated by the reference numerals 402 and 403, according to an embodiment.

Figure 5B:
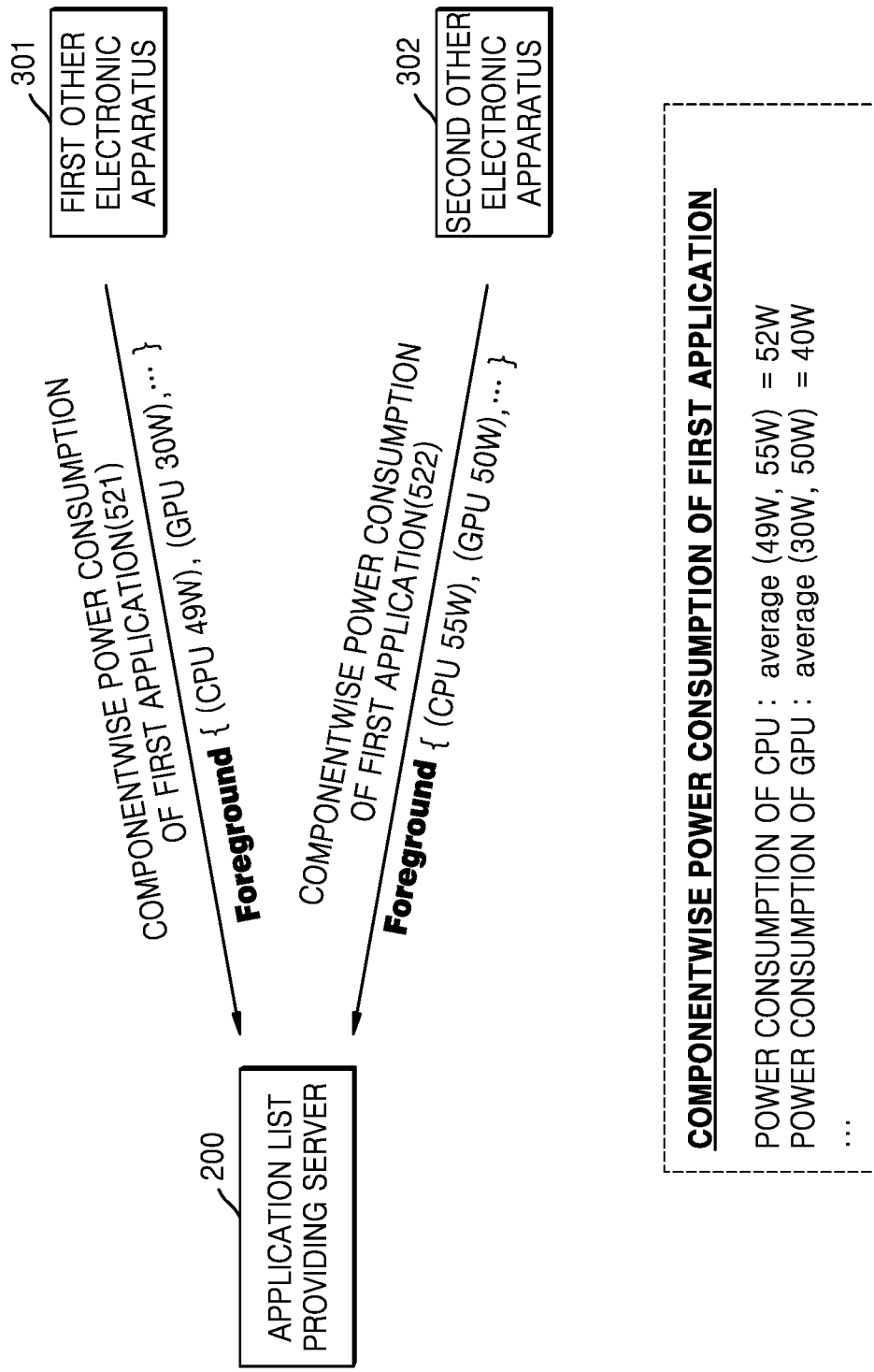

FIGS. 5A and 5B are diagrams for describing a method, performed by an application list providing server, of storing and/or managing componentwise power consumption of an application, according to some embodiments.

Referring to FIG. 5A, the application list providing server 200 may store and/or manage componentwise power consumption, according to applications. In detail, the application list providing server 200 may calculate average componentwise power consumption, based on componentwise power consumption of an application obtained from the other at least one electronic apparatus 300. For example, the application list providing server 200 may store and/or manage a table 500 indicating average componentwise power consumption, with respect to first through n-th applications.

FIG. 5B is a diagram for describing a method of calculating componentwise average power consumption 510 of the first application. Referring to the reference numeral 402 of FIG. 4, the application list providing server 200 may obtain componentwise power consumption 521 and 522 of the first application from a first other electronic apparatus 301 and a second other electronic apparatus 302 where the first application is installed.

The application list providing server 200 may calculate the average power consumption per same component, based on the obtained componentwise power consumption 521 and 522 of the first application.

Meanwhile, according to some embodiments, the application list providing server 200 may not consider performance of components. For example, the application list providing server 200 may recognize components of the first and second other electronic apparatuses 301 and 302 as the same component even when CPU performances of the first and second other electronic apparatuses 301 and 302 are different from each other.

Alternatively, the application list providing server 200 may consider operation modes (or operation states) of components. For example, the application list providing server 200 may further obtain information about an operation mode (or an operation state) per component, together with componentwise power consumption of an application from another electronic apparatus. In detail, the application list providing server 200 may further obtain information about an operation state of a component, such as {(CPU 49 W@2.0 GHz), . . . }, {(CPU 50 W@1.5 GHz), . . . }, etc. In this case, the application list providing server 200 may calculate average power consumption while considering the operation mode of the component. For example, the application list providing server 200 may assign a weight per operation mode.

Also, the application list providing server 200 may calculate the average power consumption by using amounts of power consumption of a certain operation mode. This is performed to calculate average power consumption of components when the components are manufactured by different manufacturers.

Figure 6:
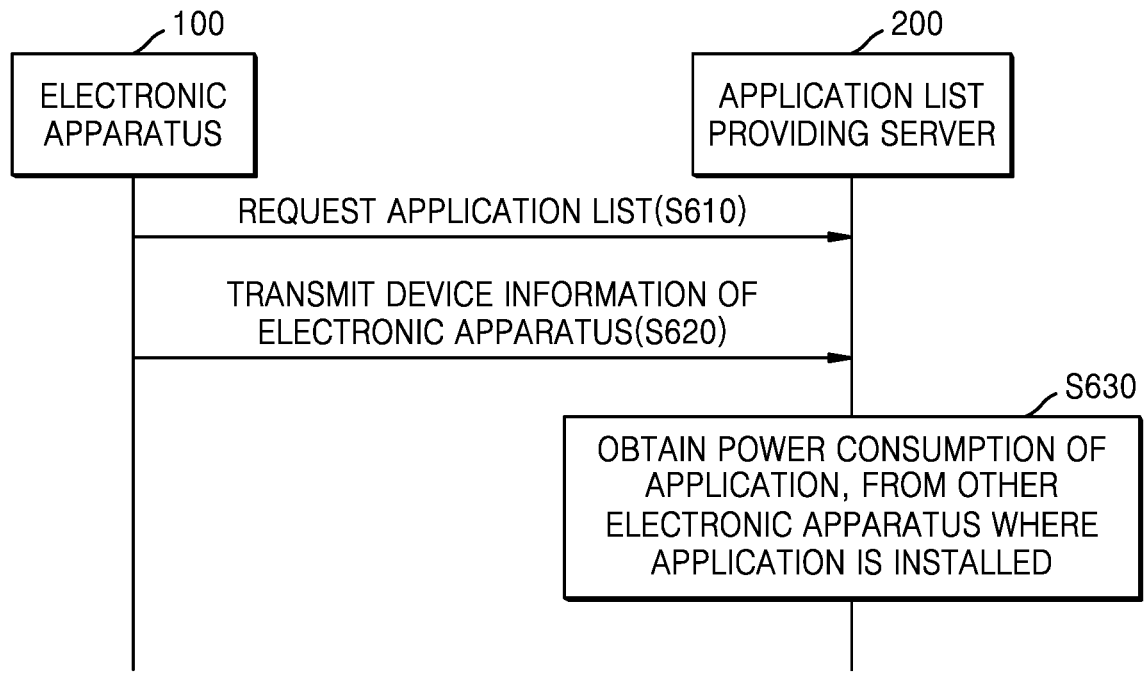
FIG. 6 is a diagram for describing a method, performed by an electronic apparatus, requesting an application list providing server for an application list, according to some embodiments.

FIG. 6 is a diagram for describing a method, performed by an electronic apparatus, requesting an application list providing server for an application list, according to some embodiments.

Referring to FIG. 6, in operation S610, the electronic apparatus 100 may request an application list. Here, the application list may be a list including ID values of downloadable applications.

Also, in operation S620, the electronic apparatus 100 may transmit device information of the electronic apparatus 100 to the application list providing server 200. Here, the device information of the electronic apparatus 100 may be a model name or product name of the electronic apparatus 100. Alternatively, the device information of the electronic apparatus 100 may include information of components included in the electronic apparatus 100. For example, the electronic apparatus 100 may notify the application list providing server 200 that the electronic apparatus 100 includes a CPU, a GPU, a memory, and a network interface (for example, Wi-Fi, GPS, local area network (LAN, or the like).

In operation S630, the application list providing server 200 may obtain componentwise power consumption of an application, from the other electronic apparatus 300 where the application is installed. Since the embodiments of FIGS. 3 through 5 described above may be applied to a method, performed by the application list providing server 200, of obtaining componentwise power consumption of an application, details thereof are not provided again.

Figure 7:
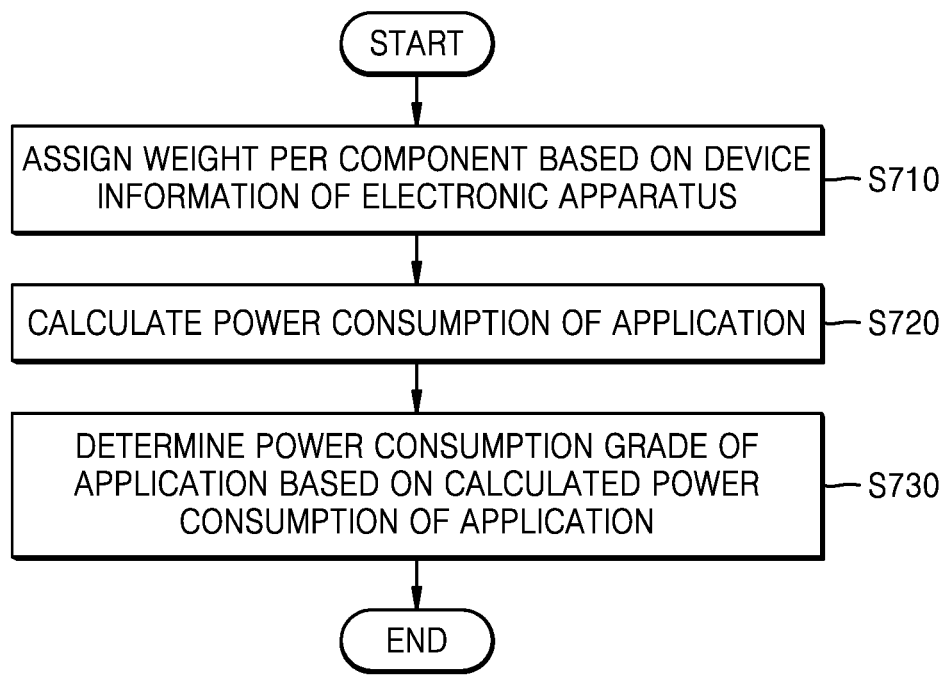
FIG. 7 is a diagram for describing a method, performed by an application list providing server, of determining a power consumption grade of an application, according to some embodiments.

FIG. 7 is a diagram for describing a method, performed by an application list providing server, of determining a power consumption grade of an application, according to some embodiments.

Referring to FIG. 7, in operation S710, the application list providing server 200 may assign a weight per component, based on device information of the electronic apparatus 100 received from the electronic apparatus 100. For example, the application list providing server 200 may determine components included in the electronic apparatus 100 based on a model name (or a product name) of the electronic apparatus 100. Alternatively, the application list providing server 200 may directly receive information about the components included in the electronic apparatus 100.

According to some embodiments, the application list providing server 200 may assign weights to the components included in the electronic apparatus 100. For example, the application list providing server 200 may obtain average power consumption of various components, as shown in the table 500 of FIG. 5. Also, the application list providing server 200 may assign a weight '1' to a component included in the electronic apparatus 100 from among the various components, and assign a weight '0' to a component that is not included in the electronic apparatus 100.

Alternatively, the application list providing server 200 may assign a low weight to a component having good performance from among the components included in the electronic apparatus 100. For example, the application list providing server 200 may assign a weight from 0.0 to 1.0 to a component based on performance of the component.

In operation S720, the application list providing server 200 may calculate power consumption of an application. The application list providing server 200 may calculate the power consumption of the application by adding componentwise power consumption of the application to which the weight is assigned. Alternatively, the application list providing server 200 may calculate the power consumption of the application by substituting the componentwise power consumption of the application, to which the weight is assigned, using a pre-determined algorithm. For example, the pre-determined algorithm may be "(power consumption of CPU to which weight is assigned)*(0.9)+(power consumption of GPU to which weight is assigned)*(0.8)+(power consumption of network to which weight is assigned)*(0.7)+ . . . ", or the like.

In operation S730, the application list providing server 200 may determine a power consumption grade of the application based on the power consumption of the application.

According to some embodiments, the application list providing server 200 may divide applications into the number of grades based on the power consumption of the applications. Also, the application list providing server 200 may assign the same grade to the divided applications. For example, the application list providing server 200 may determine a power consumption grade of applications whose power consumption is in a top 20% to be a fifth grade. Also, the application list providing server 200 may determine a power consumption grade of applications whose power consumption is in a bottom 20% to be a first grade.

FIG. 8 is a diagram for describing a method, performed by an application list providing server, of calculating power consumption of an application, according to some embodiments.

Referring to FIG. 8, the application list providing server 200 may assign weights to components included in the electronic apparatus 100. For example, the application list providing server 200 may assign a weight '1' to the components included in the electronic apparatus 100, and assign a weight '0' to components that are not included in the electronic apparatus 100. The application list providing server 200 may be aware of information about the components included in the electronic apparatus 100, based on device information of the electronic apparatus 100.

For example, the electronic apparatus 100 may not include a GPU. Accordingly, the application list providing server 200 may calculate power consumption of a first application by using an equation "(power consumption of CPU)*130 (power consumption of GPU)*0+(power consumption of network)*1+(power consumption of display)*1+ . . . ".

Meanwhile, first through tenth applications may be applications selected in response to a request to provide an application list, the request received from the electronic apparatus 100, from among downloadable applications registered in the application list providing server 200.

Figures 9, 10:
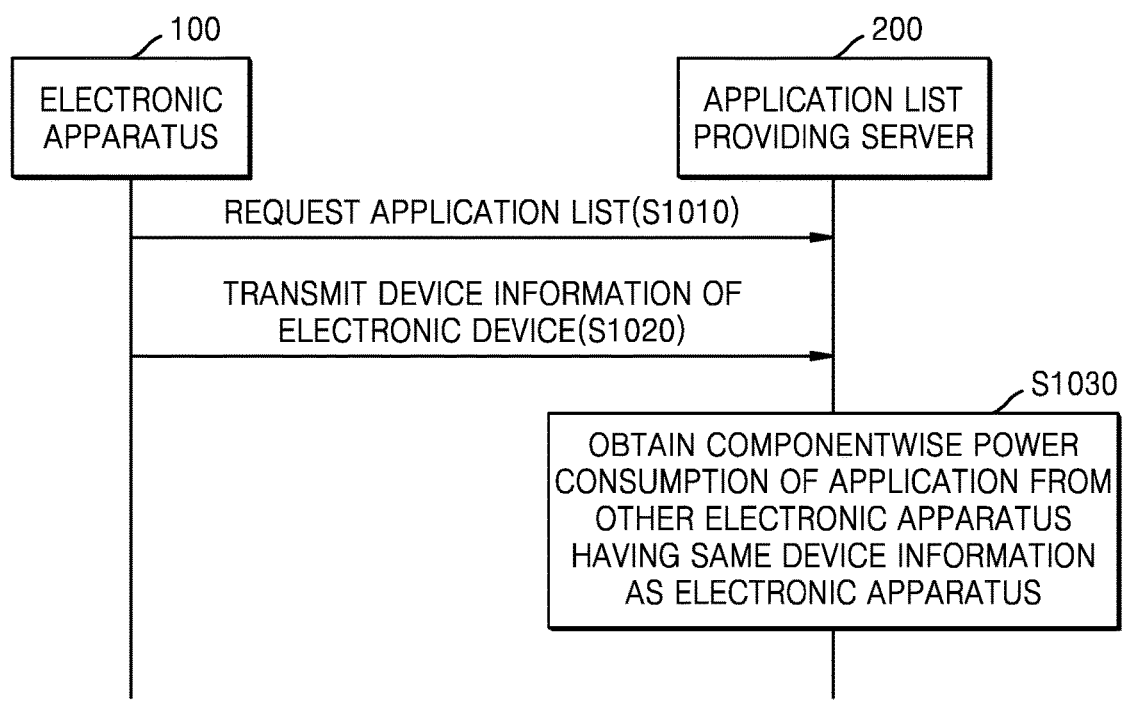
FIG. 9 is a diagram for describing a method, performed by an application list providing server, of determining power consumption grades of applications, according to some embodiments.
FIG. 10 is a diagram for describing a method, performed by an electronic apparatus, of requesting an application list providing server for an application list, according to some embodiments.

FIG. 9 is a diagram for describing a method, performed by an application list providing server, of determining power consumption grades of applications, according to some embodiments.

Referring to FIG. 9, the application list providing server 200 may determine power consumption grades of applications based on power consumption of applications calculated in FIG. 8. Here, it is assumed that the power consumption grades may be divided into first through fifth grades, and the first grade is a highest power consumption grade.

For example, the application list providing server 200 may divide first to tenth applications into 5 groups in an order of low power consumption. Also, the application list providing server 200 may assign a grade to each group. For example, the application list providing server 200 may determine a first group 910 having lowest power consumption of applications as a 'first grade', and a second group 920 having a second lowest power consumption of applications as a 'second grade'. Also, the application list providing server 200 may determine the tenth application having largest power consumption as a 'fifth grade'.

FIG. 10 is a diagram for describing a method, performed by an electronic apparatus, of requesting an application list providing server for an application list, according to some embodiments.

Referring to FIG. 10, in operation S1010, the electronic apparatus 100 may request the application list providing server 200 for an application list.

In operation S1020, the electronic apparatus 100 may transmit device information of the electronic apparatus 100 to the application list providing server 200. Here, the device information of the electronic apparatus 100 may be a model name or product name of the electronic apparatus 100. Alternatively, the device information of the electronic apparatus 100 may include information of components included in the electronic apparatus 100.

In operation S1030, the application list providing server 200 may obtain componentwise power consumption of an application from the other electronic apparatus 300 having the same device information as the electronic apparatus 100. In detail, the application list providing server 200 may obtain the componentwise power consumption of the application from the other electronic apparatus 300 having the same model name (or product name) as the electronic apparatus 100. Having the same model name (or product name) as the electronic apparatus 100 may mean including the same components as the electronic apparatus 100. Also, having the same model name (or product name) as the electronic apparatus 100 may mean having the same or similar application execution environment as the electronic apparatus 100.

Accordingly, the application list providing server 200 according to some embodiments may provide power consumption grade information significant to the electronic apparatus 100 by obtaining the power consumption of the application from the other electronic apparatus 300 having the same device information as the electronic apparatus 100.

FIG. 11 is a diagram for describing a method, performed by an application list providing server, of storing and/or managing componentwise power consumption of an application, according to some embodiments.

Referring to FIG. 11, the application list providing server 200 may store and/or manage componentwise power consumption based on applications and device information of the other electronic apparatus 300.

According to some embodiments, the application list providing server 200 may further obtain the device information of the other electronic apparatus 300 while obtaining the componentwise power consumption of an application from the other electronic apparatus 300. For example, when the application list providing server 200 obtains componentwise power consumption of a first application from the other electronic apparatus 300 and the other electronic apparatus 300 is a first model, the application list providing server 200 may reflect the received componentwise power consumption to componentwise power consumption 1110 corresponding to the first model (for example, may perform an operation, such as calculating average power consumption again). When the other electronic apparatus 300 is a second model, the application list providing server 200 may reflect the received componentwise power consumption to componentwise power consumption 1120 corresponding to the second model.

Also, when the electronic apparatus 100 that requested the application list is the first model, the application list providing server 200 may calculate power consumption of the first application based on information about the componentwise power consumption 1110 corresponding to the first model from the componentwise power consumption of the first application.

Figure 12:
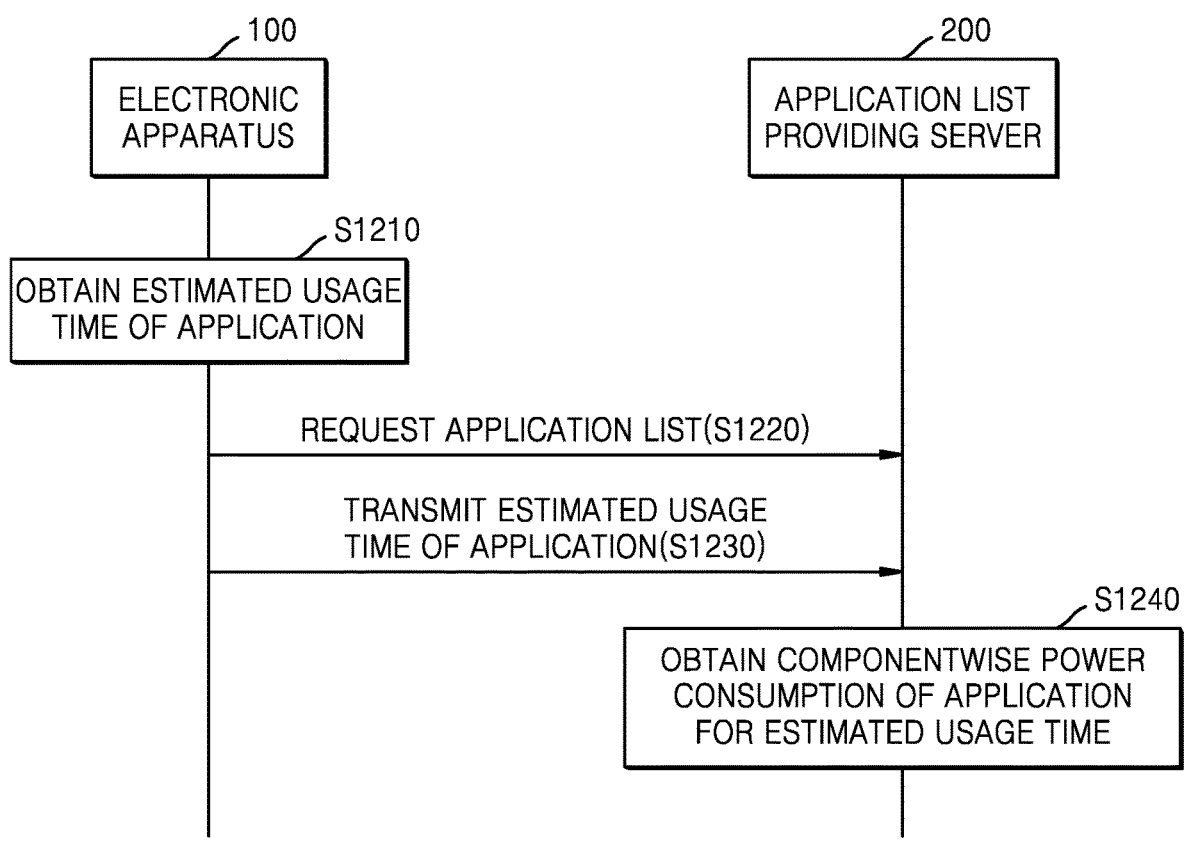
FIG. 12 is a diagram for describing a method, by an electronic apparatus, of requesting an application list providing server for an application list, according to some embodiments.

FIG. 12 is a diagram for describing a method, by an electronic apparatus, of requesting an application list providing server for an application list, according to some embodiments.

Referring to FIG. 12, in operation S1210, the electronic apparatus 100 may obtain an estimated usage time of an application. Here, the estimated usage time of the application may denote an estimated usage time for which the user of the electronic apparatus 100 is to use an application in an application list, that is, for a certain period of time (for example, for a day) after installing the application. Power consumption of the application may be equally maintained during an application usage time, or may be linearly increased or exponentially increased from a certain point of time. Accordingly, the application usage time of the user may act as an important factor in determining the power consumption of the application.

According to some embodiments, the electronic apparatus 100 may receive the estimated usage time of the application from the user. For example, the electronic apparatus 100 may request the application list providing server 200 for a list of downloadable applications (i.e., an application list) and receive the estimated usage time of the application, through an execution screen of a certain application (for example, an application store or the like) for downloading an application.

Alternatively, the electronic apparatus 100 may estimate the application usage time of the user. For example, the electronic apparatus 100 may profile categorywise usage time of applications pre-installed in the electronic apparatus 100. Also, the electronic apparatus 100 may obtain the estimated usage time of the application based on profiling results and categories of downloadable applications requested to the application list providing server 200.

In operation S1220, the electronic apparatus 100 may request the application list providing server 200 for the application list. Also, in operation S1230, the electronic apparatus 100 may transmit the estimated usage time of the application to the application list providing server 200.

In operation S1240, the application list providing server 200 may obtain componentwise power consumption of the application for the received estimated usage time.

According to some embodiments, the application list providing server 200 may obtain, from the other electronic apparatus 300, information about power consumption changing according to time.

For example, the application list providing server 200 may request the other electronic apparatus 300 for the componentwise power consumption of the application for the estimated usage time of the application, and receive the componentwise power consumption of the application.

Alternatively, the application list providing server 200 may obtain a graph, in which a time (t) is an x-axis and power consumption (W) is a y-axis (for example, $W=a*t+b$), with respect to power consumption changing according to time, from the other electronic apparatus 300. Accordingly, the application list providing server 200 may obtain the componentwise power consumption of the application for the estimated usage time of the application based on the graph obtained from the other electronic apparatus 300.

Figure 13:
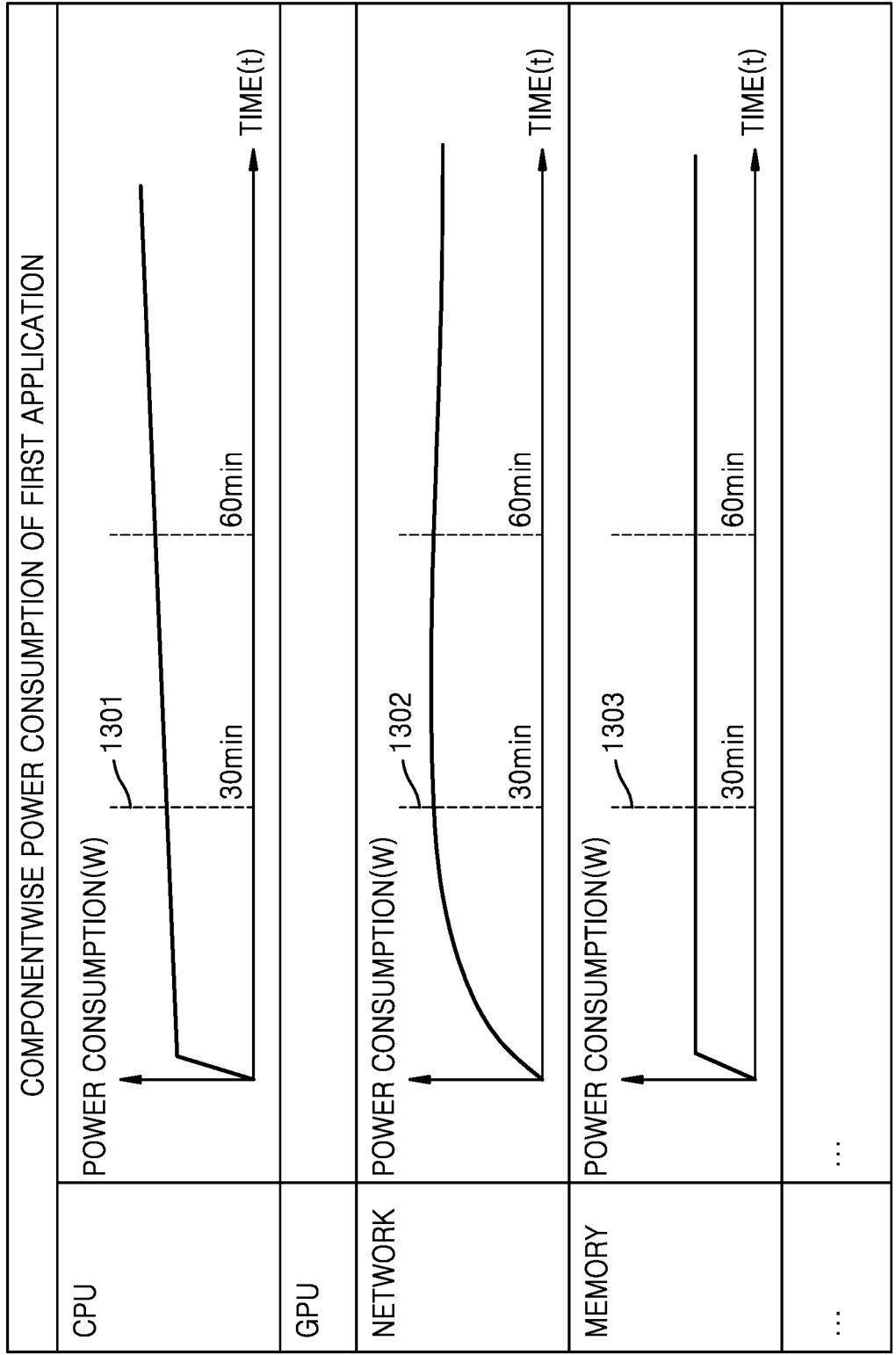
FIG. 13 is a diagram for describing a method, preformed by an application list providing server, of obtaining componentwise power consumption for an estimated usage time of an application, according to some embodiments.

FIG. 13 is a diagram for describing a method, preformed by an application list providing server, of obtaining componentwise power consumption for an estimated usage time of an application, according to some embodiments.

Referring to FIG. 13, the application list providing server 200 may obtain componentwise power consumption graphs 1300 of a first application according to time, from the other electronic apparatus 300. In FIG. 13, graphs are shown for convenience of description, but the application list providing server 200 may store and/or manage a graph formula.

For example, when an estimated usage time of an application received from the electronic apparatus 100 is 30 minutes, the application list providing server 200 may obtain power consumption at points 1301, 1302, 1303, etc. corresponding to 30 minutes from the componentwise power consumption graphs 1300.

According to an embodiment, the application list providing server 200 may further obtain device information of the electronic apparatus 100. In this case, the application list providing server 200 may obtain componentwise power consumption of an application for an estimated usage time, from componentwise power consumption graphs obtained from the other electronic apparatus 300 having the same device information as the electronic apparatus 100.

Figure 14:
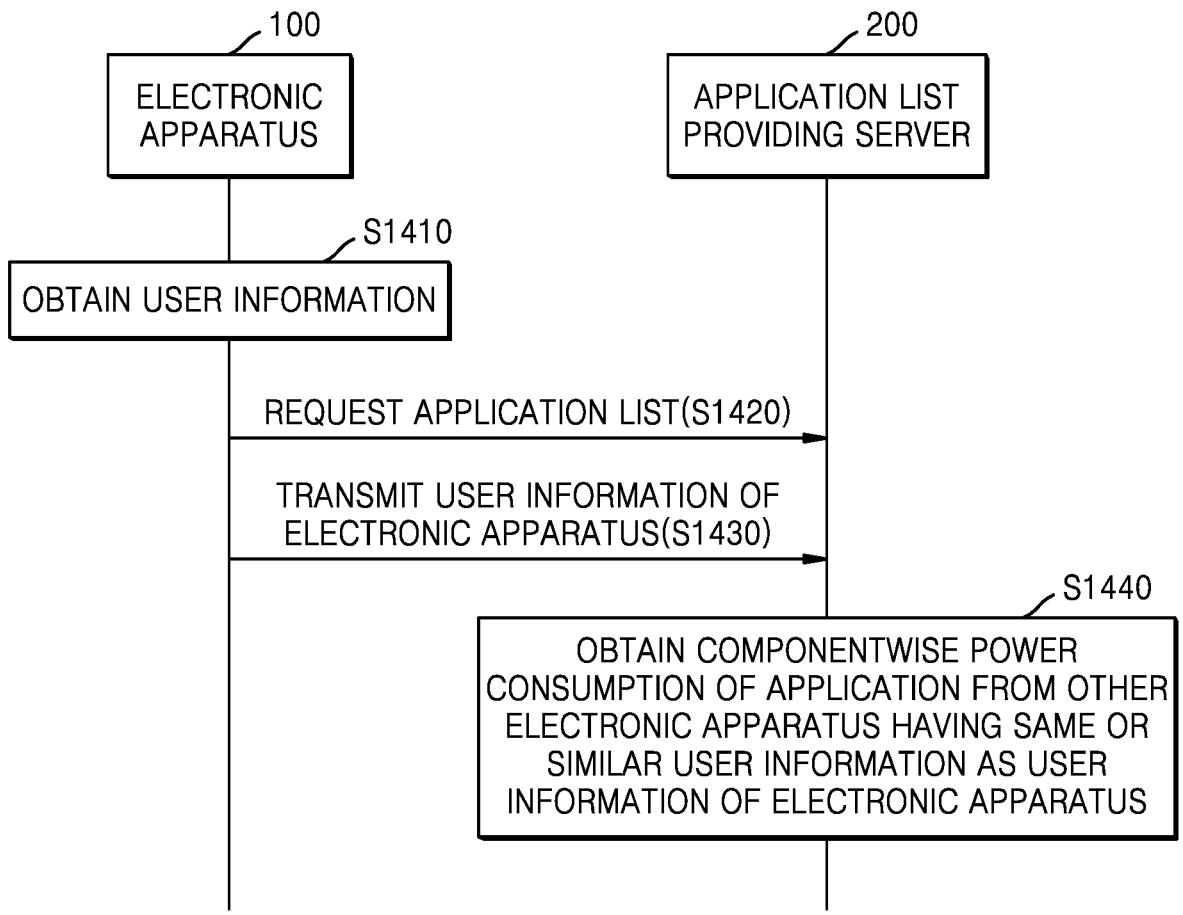
FIG. 14 is a diagram for describing a method, performed by an electronic apparatus, of requesting an application list providing server for an application list, according to some embodiments.

FIG. 14 is a diagram for describing a method, performed by an electronic apparatus, of requesting an application list providing server for an application list, according to some embodiments.

Referring to FIG. 14, in operation S1410, the electronic apparatus 100 may obtain user information of a user of the electronic apparatus 100. Here, the user information of the user of the electronic apparatus 100 may include an age, a gender, an occupation, preference, etc. of the user. The electronic apparatus 100 may obtain the user information pre-stored in the electronic apparatus 100. Alternatively, the electronic apparatus 100 may receive the user information from the user.

In operation S1420, the electronic apparatus 100 may request the application list providing server 200 for an application list.

Also, in operation S1430, the electronic apparatus 100 may provide the user information of the electronic apparatus 100 to the application list providing server 200. According to some embodiments, the electronic apparatus 100 may display, on a screen, a confirmation message indicating that the user information of the electronic apparatus 100 is externally transmitted. Alternatively, the electronic apparatus 100 may perform operation S1430 only when the user approves (for example, when a user input approving transmission is received).

In operation S1440, the application list providing server 200 may obtain componentwise power consumption of an application from the other electronic apparatus 300 having the same or similar user information as the user of the electronic apparatus 100. Having the same or similar user information as the user information of the electronic apparatus 100 may mean that at least one of the age, the gender, the occupation, and the preference is the same as the user of the electronic apparatus 100. For example, the application list providing server 200 may obtain the componentwise power consumption of the application from the other electronic apparatus 300 having user information of the same age group (for example, teenagers, twenties, or the like) as the user of the electronic apparatus 100.

Alternatively, the application list providing server 200 may obtain the componentwise power consumption of the application from the other electronic apparatus 300 having user information of the same gender as the user of the electronic apparatus 100.

Alternatively, the application list providing server 200 may obtain the componentwise power consumption of the application from the other electronic apparatus 300 having the same or similar preference as the user of the electronic apparatus 100, but is not limited thereto.

FIG. 15 is a diagram for describing a method, performed by an application list providing server, of storing and/or managing componentwise power consumption of an application including user information from another electronic apparatus, according to some embodiments.

Referring to FIG. 15, the application list providing server 200 according to some embodiments may further obtain user information of the other electronic apparatuses 300 together with componentwise power consumption of applications, from the other electronic apparatuses 300.

Also, the application list providing server 200 may group similar user information of the other electronic apparatuses 300. For example, the application list providing server 200 may store and/or manage componentwise average power consumption of applications received from other electronic apparatuses having the same {age group, gender, occupation}. In detail, the application list providing server 200 may store and/or manage componentwise average power consumption 1510 and 1520 of first and second applications received from other electronic apparatuses having user information of {teenager, female, student}.

According to an embodiment, the application list providing server 200 may further obtain device information of the electronic apparatus 100. In this case, the application list providing server 200 may obtain componentwise power consumption of the other electronic apparatus from the other electronic apparatus having the same device information and the same or similar user information as the electronic apparatus 100.

Figure 16:
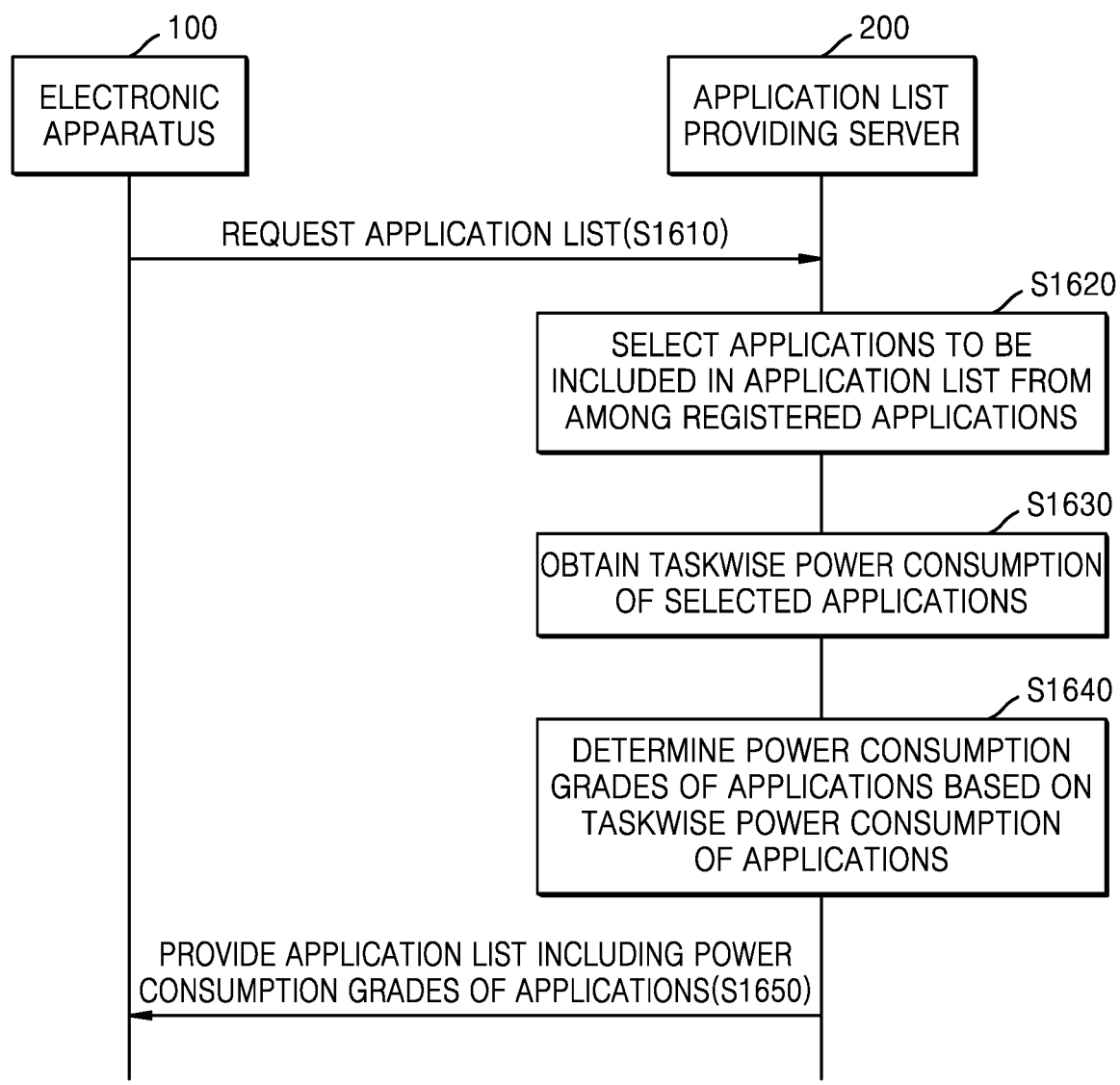
FIG. 16 is another diagram for describing an operating method of an application list providing system, according to some embodiments.

FIG. 16 is another diagram for describing an operating method of an application list providing system, according to some embodiments.

Referring to FIG. 16, in operation S1610, the electronic apparatus 100 may request the application list providing server 200 for an application list including an ID value of at least one application downloadable by the electronic apparatus 100 (i.e., at least one downloadable application).

For example, when a user of the electronic apparatus 100 executes a certain application for downloading an application (for example, an application store or the like), the electronic apparatus 100 may request the application list providing server 200 for the application list including ID values of downloadable applications. Alternatively, the electronic apparatus 100 may request the application list including ID values of downloadable applications corresponding to a certain category selected by the user or a search word input by the user. Alternatively, the electronic apparatus 100 may request the application list including ID values of downloadable applications recommended by the application list providing server 200 based on preference of the user.

In operation S1620, the application list providing server 200 may select an application to be included in the application list from among applications registered in the application list providing server 200, in response to the request to provide the application list received from the electronic apparatus 100. For example, the application list providing server 200 may select an application that has been downloaded the most by electronic apparatuses using the application list providing server 200. Alternatively, the application list providing server 200 may select an application corresponding to a certain category selected by the user of the electronic apparatus 100 or a certain search word input by the user.

In operation S1630, the application list providing server 200 may obtain taskwise power consumption of the selected application. Here, taskwise power consumption of an application may be power consumed by another electronic apparatus where the application is installed, according to tasks of the application. For example, taskwise power consumption of an application may include power consumed to perform a first task, power consumed to perform a second task, etc. when the application performs first through n-th tasks. In detail, taskwise power consumption of an e-mail application may include power consumed to perform an email browsing task, power consumed to perform an email writing task, and power consumed to perform an email deleting task.

Meanwhile, since the embodiments of FIGS. 3A and 3B described above may be applied to a method, performed by the application list providing server 200, of obtaining taskwise power consumption of an application from the other electronic apparatus 300, details thereof are not provided again.

In operation S1640, the application list providing server 200 may determine a power consumption grade of the application based on the taskwise power consumption of the application.

For example, the application list providing server 200 may classify applications to be included in an application list based on a plurality of power consumption grades. For example, the application list providing server 200 may classify the applications into three grades, such as good, fair, and poor. Alternatively, the application list providing server 200 may classify the applications into first through fifth grades. A method, performed by the application list providing server 200, of determining power consumption grades of applications will be described below with reference to FIG. 17.

In operation S1650, the application list providing server 200 may provide the application list including the power consumption grades of the applications to the electronic apparatus 100.

Figure 17:
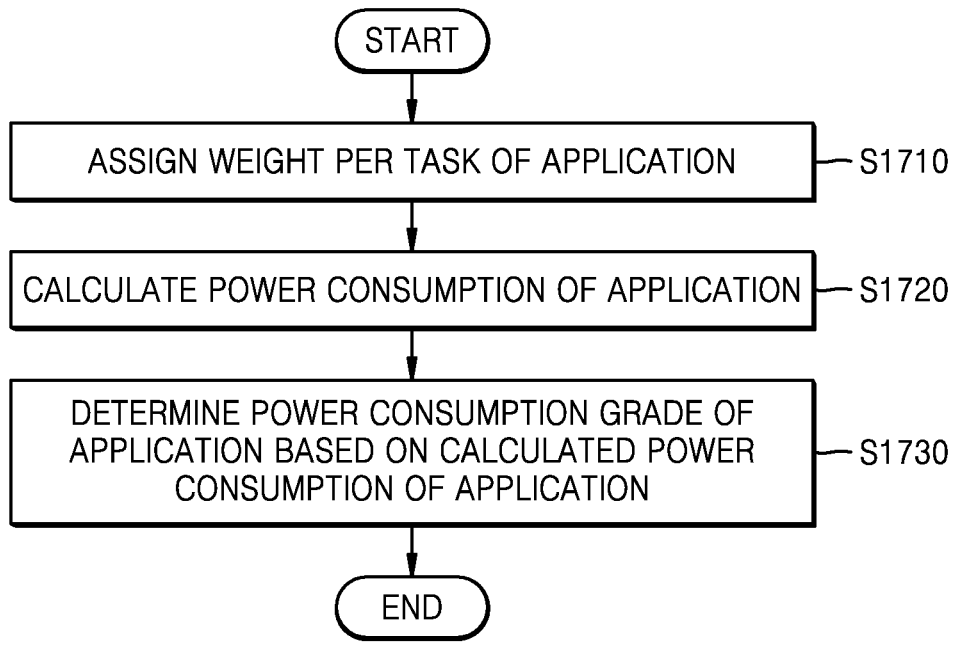
FIG. 17 is a diagram for describing a method, performed by an application list providing server, of determining a power consumption grade of an application, according to some embodiments.

FIG. 17 is a diagram for describing a method, performed by an application list providing server, of determining a power consumption grade of an application, according to some embodiments.

Referring to FIG. 17, in operation S1710, the application list providing server 200 may assign a weight per task of an application. For example, the application list providing server 200 may assign a weight per task of an application based on importance pre-set according to tasks. In detail, in a browser application, highest importance may be set to a searching task.

Alternatively, the application list providing server 200 may assign a weight per task of an application based on user information obtained from the electronic apparatus 100. For example, the application list providing server 200 may assign a largest weight to a video reproducing task of a browser application when a user of the electronic apparatus 100 has high preference with respect to watching a video.

Alternatively, the application list providing server 200 may assign a large weight to a task that is performed most often, by further obtaining, from the electronic apparatus 100, the number of times each task of the application is performed.

In operation S1720, the application list providing server 200 may calculate power consumption of the application. For example, the application list providing server 200 may calculate the power consumption of the application by adding amounts of taskwise power consumption of the application, to which the weight is assigned. Alternatively, the application list providing server 200 may calculate the power consumption of the application by substituting the taskwise power consumption of the application, to which the weight is assigned, for a pre-determined algorithm.

In operation S1730, the application list providing server 200 may determine a power consumption grade of the application based on the power consumption of the application.

For example, when the power consumption grade is divided into good, fair, and poor, the application list providing server 200 may divide the applications into 3 groups based on the power consumption of the applications and determine the power consumption grade of the applications included in each group as one of good, fair, and poor.

Figure 18:
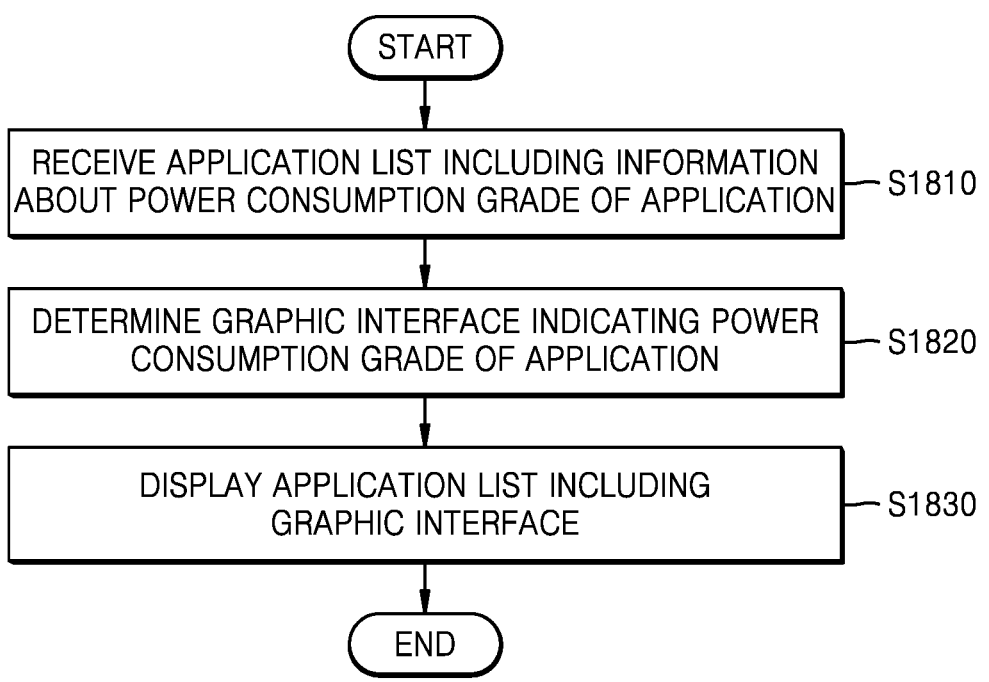
FIG. 18 is a diagram for describing a method, performed by an electronic apparatus, of displaying an application list, according to some embodiments.

FIG. 18 is a diagram for describing a method, performed by an electronic apparatus, of displaying an application list, according to some embodiments.

Referring to FIG. 18, in operation S1810, the electronic apparatus 100 may receive an application list including a power consumption grade of an application from the application list providing server 200. Here, the power consumption grade may be a power consumption grade of an application assigned by the application list providing server 200, and may be a character, a number, a symbol, an image, sound, or the like indicating the power consumption grade. For example, the electronic apparatus 100 may receive the application list including an image, text, an animation, or the like intuitively indicating the power consumption grade of the application.

Meanwhile, according to some embodiments, when the electronic apparatus 100 receives a graphic interface from the application list providing server 200, operation S1820 may be omitted.

In operation S1820, the electronic apparatus 100 may determine a graphic interface indicating the power consumption grade of the application.

Here, the graphic interface may be an image, text, an animation, or the like.

Also, in the graphic interface, at least one of a color, brightness, and chroma of an object indicating an ID value of the application in the application list may be differently represented based on the power consumption grade of the application. For example, the electronic apparatus 100 may display a color of an object indicating an icon, a name, or the like of an application in green when a power consumption grade of the application is high. Alternatively, the electronic apparatus 100 may display a color of an object indicating an icon, a name, or the like of an application in red when a power consumption grade of the application is low. Alternatively, the electronic apparatus 100 may increase brightness of an object indicating an icon, a name, or the like of an application as a power consumption grade of the application increases.

Also, in the graphic interface, a size of an object indicating an ID value of the application in the application list may be differently represented based on a power consumption grade of the application. For example, the electronic apparatus 100 may enlarge a size of an icon of an application or a size of text indicating a name of the application when a power consumption grade of the application is high.

According to some embodiments, the electronic apparatus 100 may determine an arrangement of the applications in the application list based on the power consumption grades of the applications. For example, the electronic apparatus 100 may arrange the applications in the application list in a descending order of power consumption grades.

Alternatively, the electronic apparatus 100 may vary feedback (or a reaction) when an application in the application list is selected, based on the power consumption grades of the applications. For example, upon receiving a user input of selecting one application from the application list, the electronic apparatus 100 may vary vibration strength based on a power consumption grade of the selected application. Alternatively, the electronic apparatus 100 may vary volume or a type of a notification sound based on the power consumption grade of the selected application.

In operation S1830, the electronic apparatus 100 may display the application list including the graphic interface indicating the power consumption grades of the applications. Alternatively, when the power consumption grade of the application is indicated by feedback (for example, a notification sound, vibration, or the like) regarding the selecting of the application by the user, the electronic apparatus 100 may display the application list including such feedback.

FIGS. 19A through 19F illustrate embodiments of displaying, an electronic apparatus, an application list.

Figure 19A:
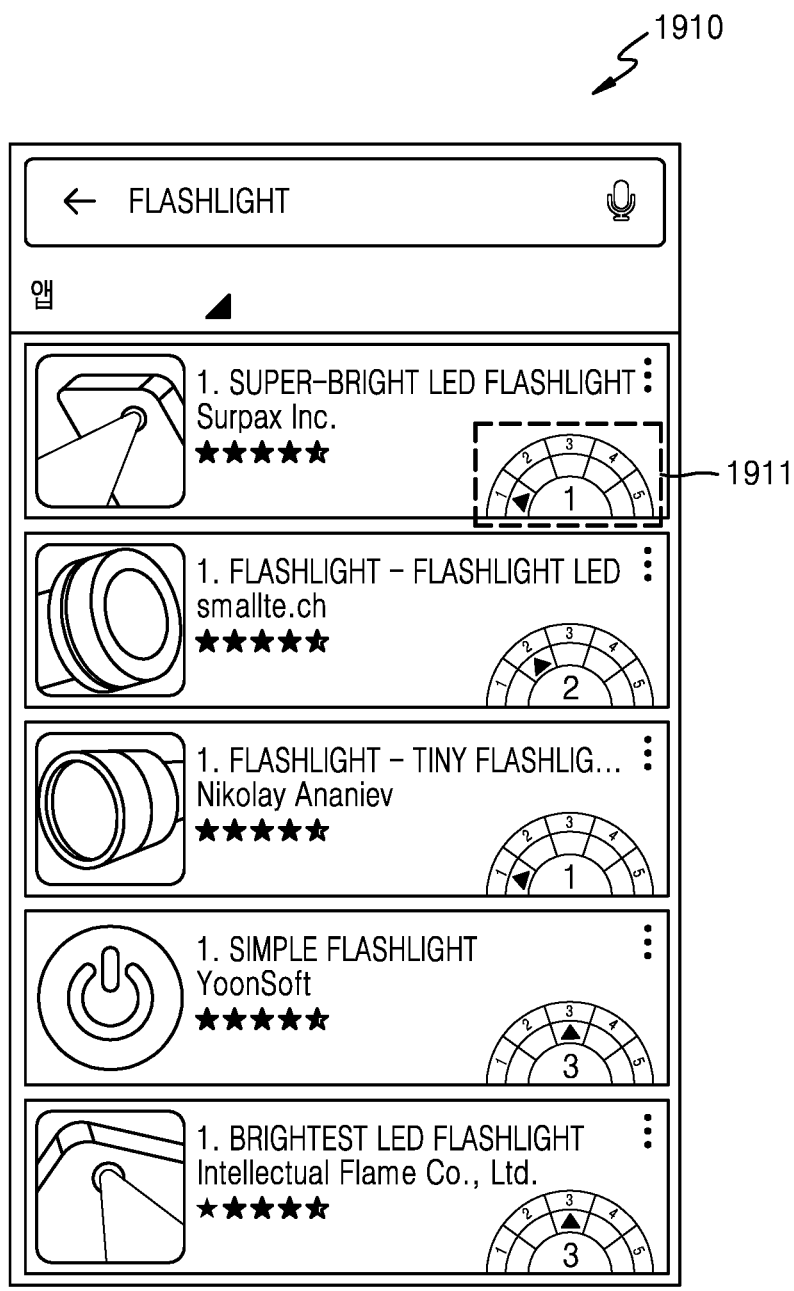
FIGS. 19A through 19F illustrate embodiments of displaying, an electronic apparatus, an application list.

Referring to FIG. 19A, the electronic apparatus 100 may display an application list 1910 including an image 1911 indicating a power consumption grade (for example, a first grade, a second grade, or a third grade) of an application.

Figure 19B:
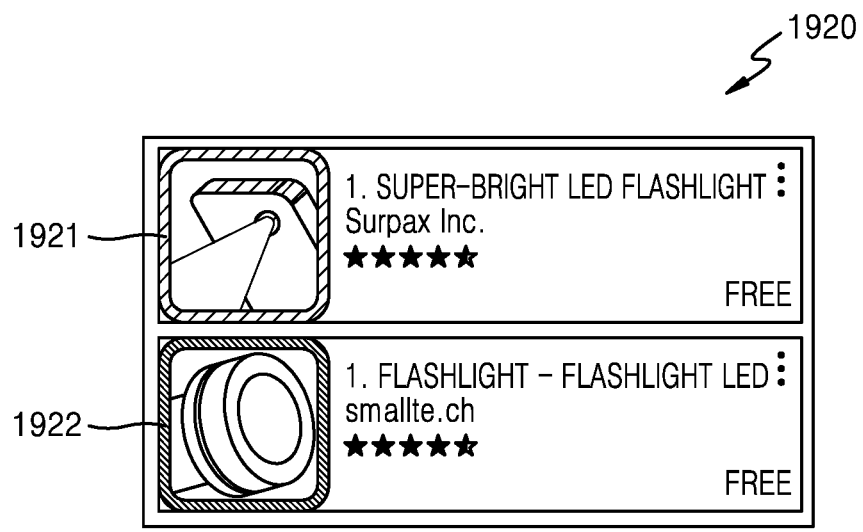

Referring to FIG. 19B, the electronic apparatus 100 may vary colors or shapes of an icon 1921 of a first application and an icon 1922 of a second application in an application list 1920 so as to intuitively indicate power consumption grades of applications. For example, the electronic apparatus 100 may display a border of the icon 1921 of the first application having a high power consumption grade in green (shown in thick hatching). On the other hand, the electronic apparatus 100 may display a border of the icon 1922 of the second application having a low power consumption grade in red (shown in thin hatching).

Figure 19C:
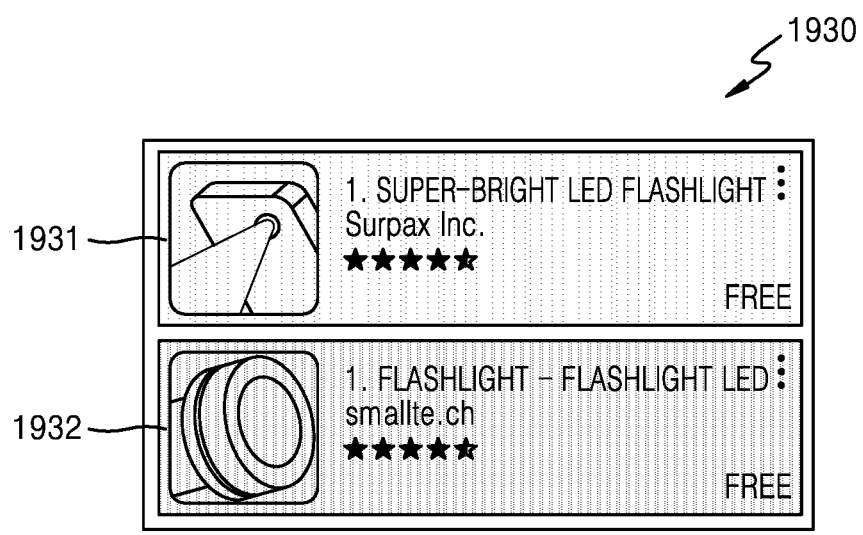

Alternatively, as shown in FIG. 19C, the electronic apparatus 100 may vary colors of an item 1931 of a first application and an item 1932 of a second application in an application list 1930 so as to intuitively indicate power consumption grades of applications. For example, the electronic apparatus 100 may display the item 1931 of the first application having a high power consumption grade in green (shown in bright dot patterns). On the other hand, the electronic apparatus 100 may display the item 1932 of the second application having a low power consumption grade in red (shown in dark dot patterns).

Figure 19D:
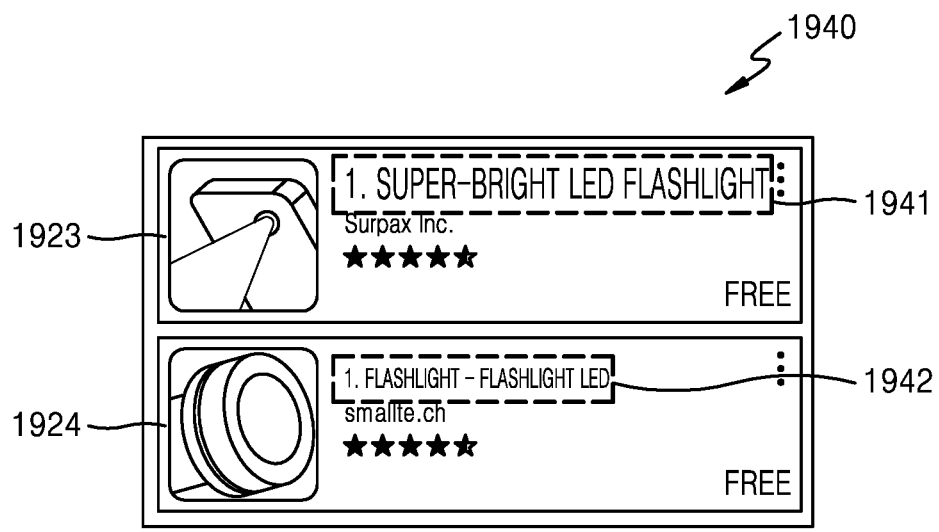

Alternatively, as shown in FIG. 19D, the electronic apparatus 100 may display text 1941 indicating a name of a first application having a high power consumption grade larger than text 1942 indicating a name of a second application having a low power consumption grade in an application list 1940. Alternatively, the electronic apparatus 100 may display the text indicating the name of the first application having the high power consumption grade in a twinkling animation.

Figure 19E:
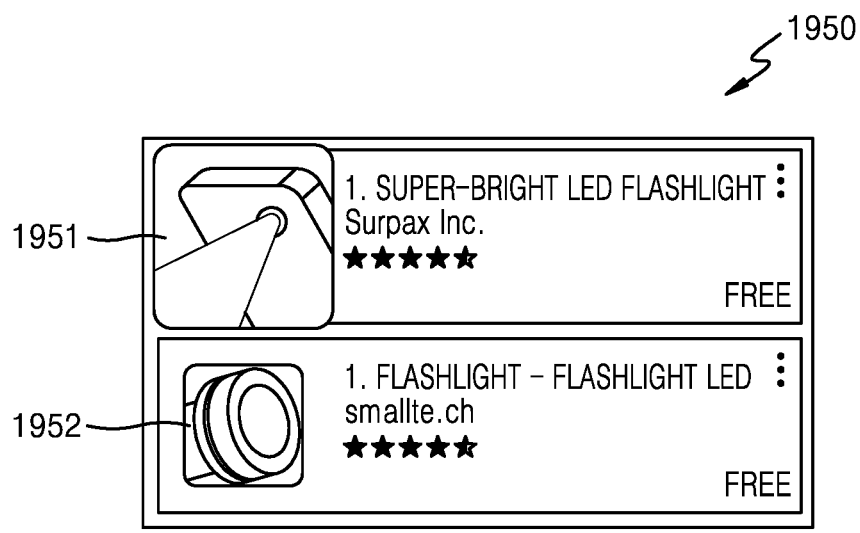

Alternatively, as shown in FIG. 19E, the electronic apparatus 100 may display an icon 1951 of a first application having a high power consumption grade larger than an icon 1952 of a second application having a low power consumption grade in an application list 1950.

Figure 19F:
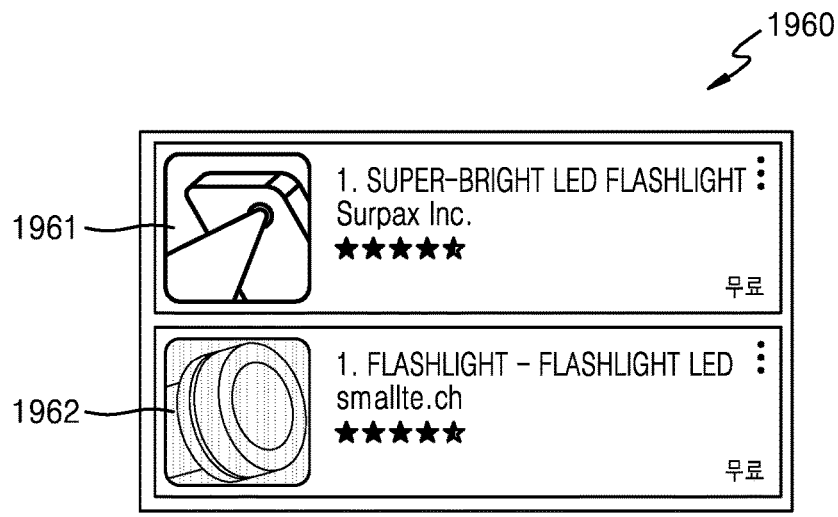

Alternatively, as shown in FIG. 19F, the electronic apparatus 100 may display brightness of an icon 1961 of a first application having a high power consumption grade to be high, and brightness of an icon 1962 of a second application having a low power consumption grade to be low in an application list 1960.

As shown in FIGS. 19A through 19F, the electronic apparatus 100 may intuitively provide, to a user, information about power consumption of downloadable applications by using various methods.

Figure 20:
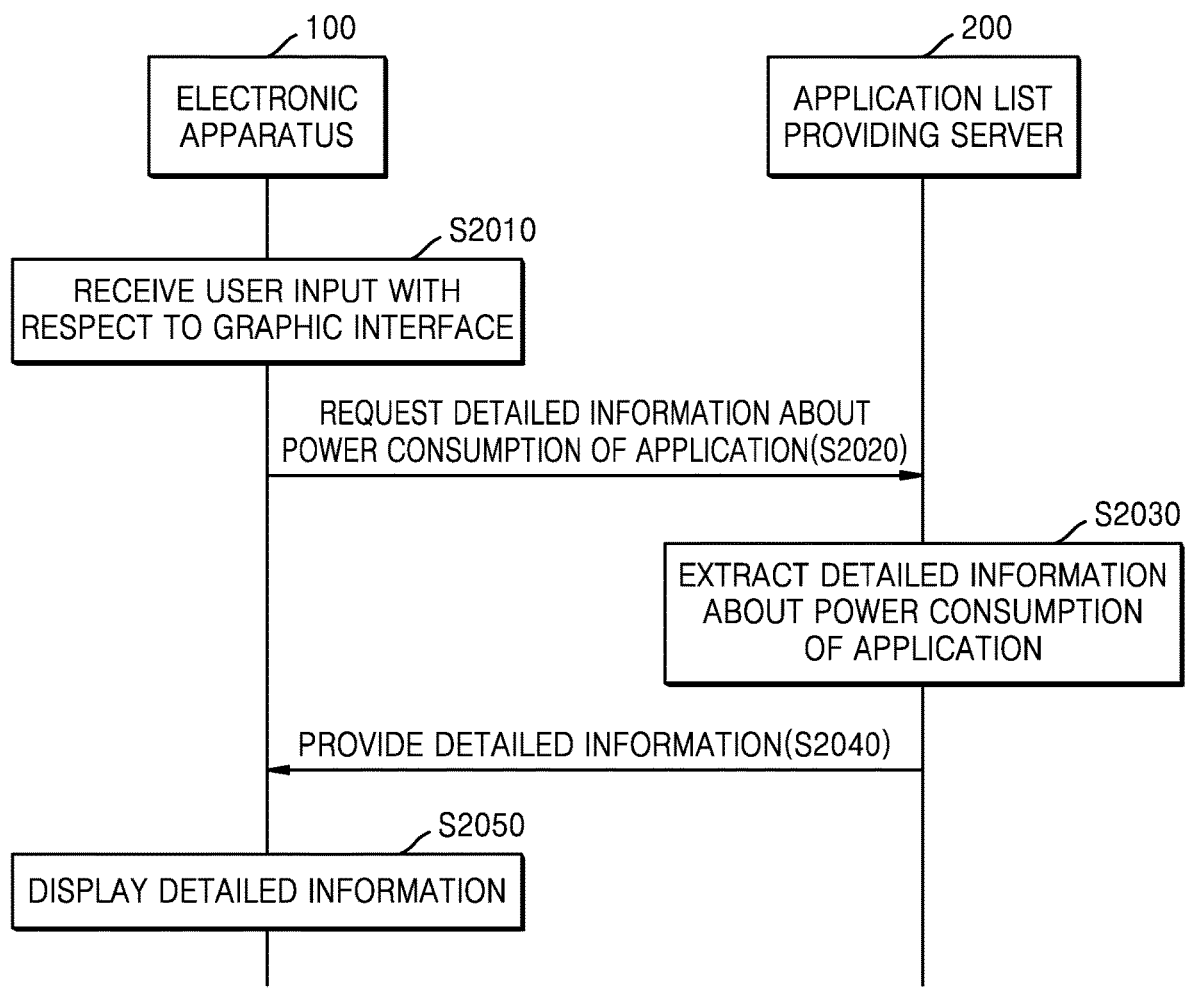
FIG. 20 is a diagram for describing a method, performed by an electronic apparatus, of providing detailed information about a power consumption grade of an application, according to some embodiments.

FIG. 20 is a diagram for describing a method, performed by an electronic apparatus, of providing detailed information about a power consumption grade of an application, according to some embodiments.

Referring to FIG. 20, in operation S2010, the electronic apparatus 100 may receive a user input with respect to a graphic interface indicating a power consumption grade of a certain application in an application list. For example, the electronic apparatus 100 may receive a user input of selecting an image indicating the power consumption grade of the certain application. Alternatively, the electronic apparatus 100 may receive a user input of selecting the certain application in the application list, and then receive a user input of selecting the graphic interface indicating the power consumption grade of the certain application included in a window where detailed information about the certain application is displayed.

In operation S2020, when the user input is received, the electronic apparatus 100 may request the application list providing server 200 for detailed information about power consumption of the certain application.

In operation S2030, the application list providing server 200 may obtain the detailed information about the power consumption of the certain application. For example, the application list providing server 200 may obtain information about componentwise power consumption of the certain application. Alternatively, the application list providing server 200 may calculate power consumption grade of the certain application per device information.

Alternatively, when the application list providing server 200 stores and/or manages componentwise power consumption graphs according to usage times of applications, the application list providing server 200 may obtain a componentwise power consumption graph according to a usage time of the certain application.

Alternatively, when the application list providing server 200 stores and/or manages user information of the other electronic apparatus 300, the application list providing server 200 may obtain information about other applications installed in the other electronic apparatus 300 having the same or similar user information as a user of the electronic apparatus 100.

Alternatively, when the application list providing server 200 obtains power consumption per operating system (OS) from the other electronic apparatus 300, the application list providing server 200 may obtain power consumption of the certain application per OS.

Alternatively, when the application list providing server 200 stores and/or manages power consumption grades of applications per version, the application list providing server 200 may obtain a power consumption grade of the certain application per version.

In operation S2040, the application list providing server 200 may provide the obtained detailed information to the electronic apparatus 100.

In operation S2050, the electronic apparatus 100 may display the detailed information received from the application list providing server 200.

Figure 21A:
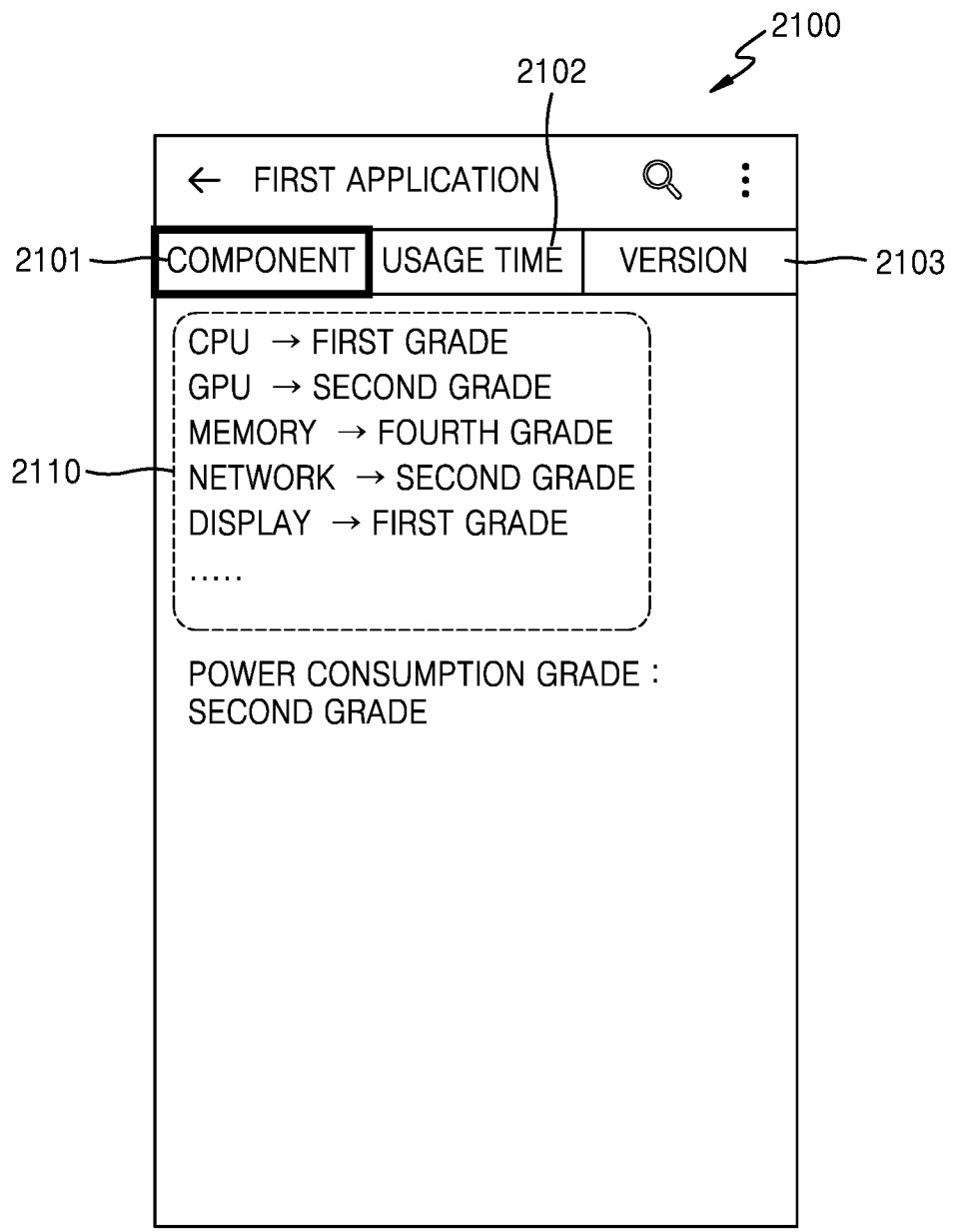
FIGS. 21A through 21C illustrate examples of displaying, by an electronic apparatus, detailed information about a power consumption grade of a certain application.
Figure 21B:
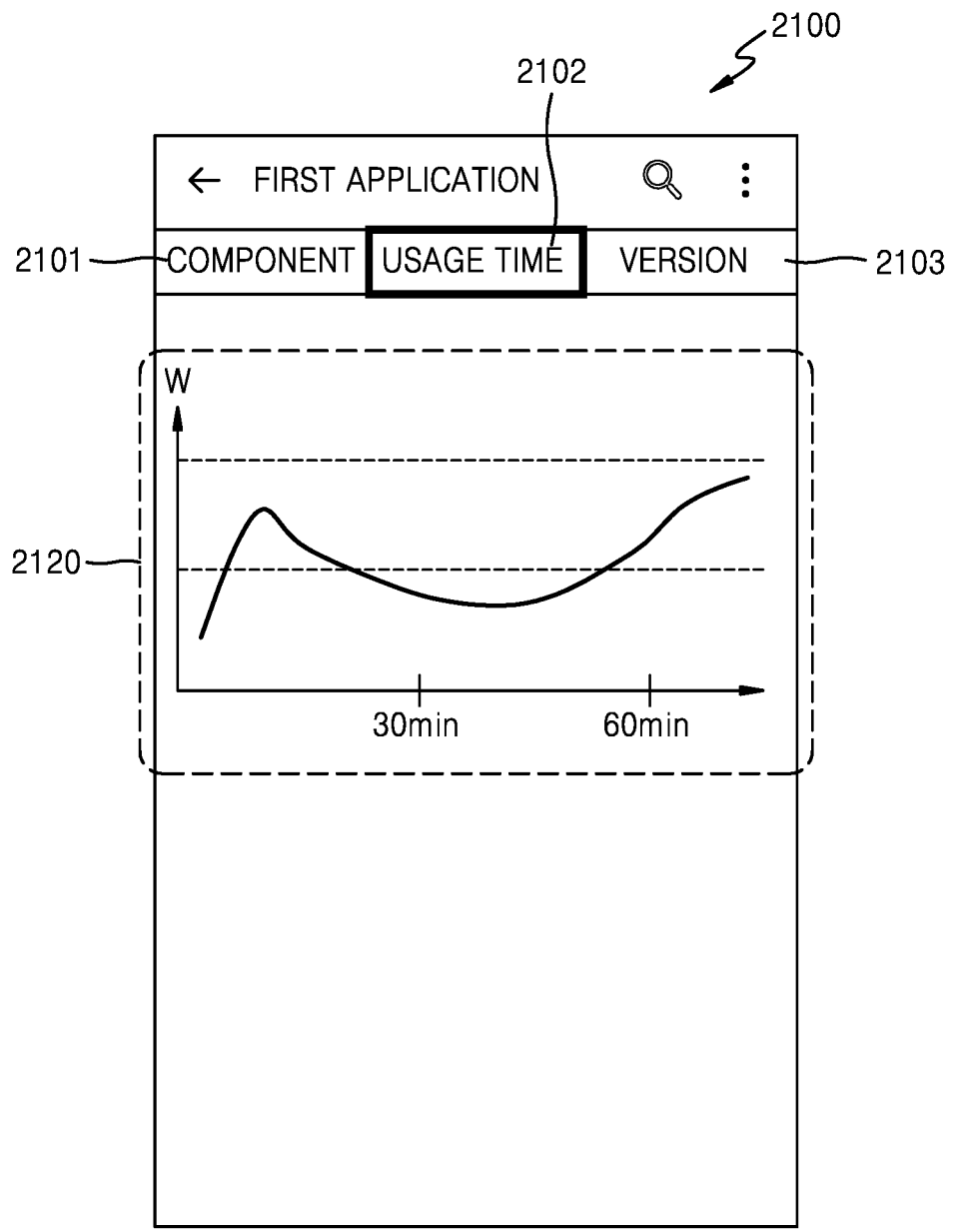
Figure 21C:
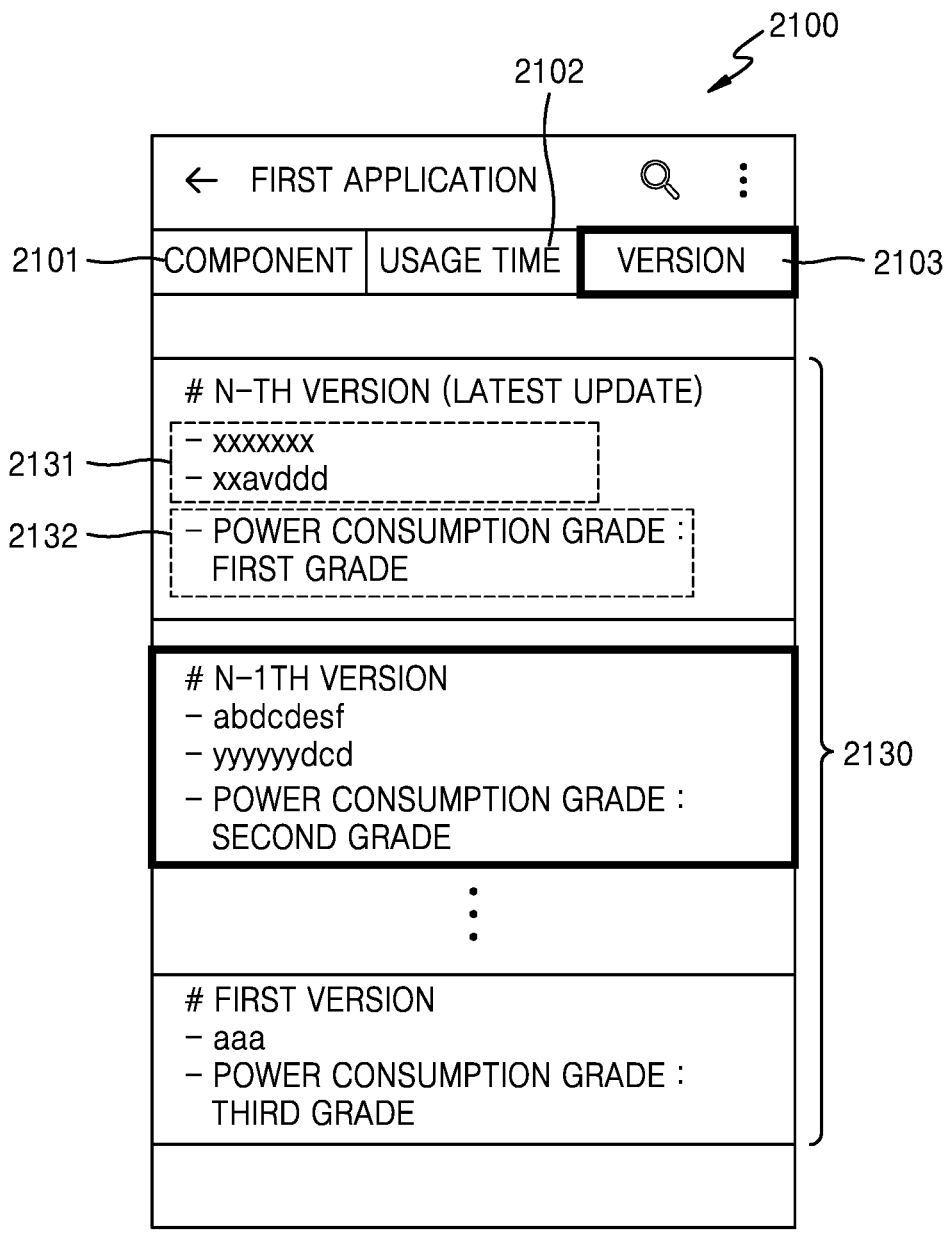

FIGS. 21A through 21C illustrate examples of displaying, by an electronic apparatus, detailed information about a power consumption grade of a certain application.

Referring to FIGS. 21A through 21C, a page 2100 indicating detailed information of a first application may include a first sub-page 2101 providing a power consumption grade per component, a second sub-page 2102 providing power consumption according to usage times, and a third sub-page 2103 providing power consumption grade per version. A user may select the first through third sub-pages 2101 through 2103 to receive various types of detailed information of the first application.

In detail, the first sub-page 2101 shown in FIG. 21A may include objects indicating power consumption grades per component included in the electronic apparatus 100. For example, the electronic apparatus 100 may display text 2110 indicating componentwise grades as shown in FIG. 21A. Alternatively, the electronic apparatus 100 may display a graph, an image, or an animation indicating the componentwise grades.

The second sub-page 2102 shown in FIG. 21B may include a graph 2120 indicating a power consumption change according to usage time of a first application. Here, the graph 2120 may be a graph indicating power consumption per minute.

The third sub-page 2103 shown in FIG. 21C may include objects 2130 indicating a power consumption grade change of a first application per version. The objects 2130 may include major update information 2131 and power consumption grade information 2132 of the first application per version.

Meanwhile, the electronic apparatus 100 may provide various types of detailed information related to the power consumption grade of the first application, in addition to the detailed information shown in FIGS. 21A through 21C. For example, the electronic apparatus 100 may provide power consumption grades of other applications in the same or similar category as the first application. Alternatively, the electronic apparatus 100 may recommend other applications having high power consumption grades based on preference of the user. Here, information about the other recommended applications may be received from the application list providing server 200.

As such, the electronic apparatus 100 may enable a user of the electronic apparatus 100 to select a low-power application.

FIG. 22 is a diagram for describing a method, performed by an application list providing server, of obtaining feedback with respect to power consumption grade information of an application, according to some embodiments.

Figure 22A:
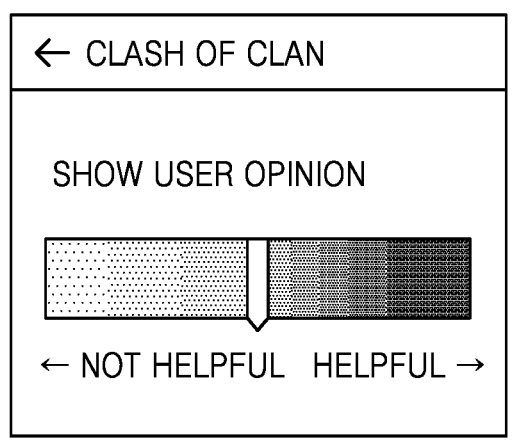
FIGS. 22A and 22B are diagrams for describing a method, performed by an application list providing server, of obtaining feedback with respect to power consumption grade information of an application, according to some embodiments.
Figure 22B:
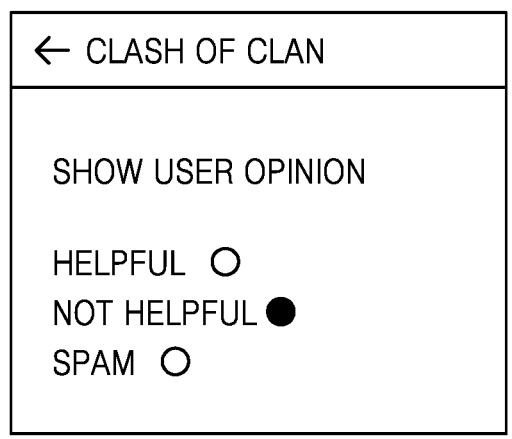

Referring to FIGS. 22A and 22B, the application list providing server 200 may obtain feedback with respect to a power consumption grade from the electronic apparatus 100 or the other electronic apparatus 300. For example, the electronic apparatus 100 or the other electronic apparatus 300 may provide the feedback on a screen where an application list is displayed. Alternatively, the electronic apparatus 100 or the other electronic apparatus 300 ay provide the feedback on a screen where detailed information of an application is displayed.

For example, as shown in FIG. 22A, the application list providing server 200 may provide a bar-type interface 2210 to the electronic apparatus 100 or the other electronic apparatus 300. A user of the electronic apparatus 100 or the other electronic apparatus 300 may provide feedback on whether power consumption grade information of an application provided by the application list providing server 200 is useful by moving an arrow 2211 in the bar-type interface 2210 to the left or the right.

Alternatively, as shown in FIG. 22B, the application list providing server 200 may provide a check box-type interface 2220. The user of the electronic apparatus 100 or the other electronic apparatus 300 may provide feedback on whether power consumption grade information of an application provided by the application list providing server 200 is useful by selecting one of check boxes 2211, 2222, and 2223 in the check-box type interface 2220.

FIG. 23 is a diagram for describing a method, performed by an electronic apparatus, of determining a power consumption grade of an application, according to some embodiments.

Referring to FIG. 23, in operation S2310, the electronic apparatus 100 may request the application list providing server 200 for an application list including an ID value of at least one application downloadable by the electronic apparatus 100 (i.e., at least one downloadable application). An ID value of an application may include a name, an icon, a category, abstract information, or etc. of the application.

For example, when a user of the electronic apparatus 100 executes a certain application for downloading an application (for example, an application store or the like), the electronic apparatus 100 may request the application list providing server 200 for an application list including ID values of downloadable applications. Alternatively, the electronic apparatus 100 may request an application list including ID values of downloadable applications corresponding to a certain category selected by the user or a search word input by the user. Alternatively, the electronic apparatus 100 may request an application list including ID values of downloadable applications recommended by the application list providing server 200 based on preference of the user.

In operation S2320, the application list providing server 200 may select an application to be included in the application list from among applications registered in the application list providing server 200, in response to the request to provide an application list received from the electronic apparatus 100. For example, the application list providing server 200 may select an application downloaded the most by an electronic apparatus using the application list providing server 200. Alternatively, the application list providing server 200 may select an application corresponding to a certain category selected by the user of the electronic apparatus 100 or a search word input by the user.

In operation S2330, the application list providing server 200 may obtain power consumption of the selected application from the other electronic apparatus 300 where the selected application is installed. Here, power consumption of an application may be determined based on componentwise power consumed by each component included in the other electronic apparatus 300 to execute the application. Alternatively, power consumption of an application may be determined based on power consumed by the other electronic apparatus 300 per task of the application. Since the embodiments of FIGS. 3A and 3B described above may be applied to a method, preformed by the application list providing server 200, of obtaining power consumption of an application from the other electronic apparatus 300, details thereof are not provided again. Also, since the embodiments of operation S710 and/or operation S720 of FIG. 7 described above may be applied to a method, performed by the application list providing server 200, of determining power consumption of an application based on componentwise power consumption of the application, details thereof are not provided again. Also, since the embodiments of operation S1710 and/or operation S1720 of FIG. 17 described above may be applied to a method, performed by the application list providing server 200, of determining power consumption of an application based on taskwise power consumption of the application, details thereof are not provided again.

According to some embodiments, the application list providing server 200 may obtain power consumption of the application from the other electronic apparatus 300 having the same device information as the electronic apparatus 100. Here, the device information may include a model name or a product name of the electronic apparatus 100. In this case, the electronic apparatus 100 may provide the device information of the electronic apparatus 100 to the application list providing server 200.

Alternatively, the application list providing server 200 may obtain power consumption of the application from the other electronic apparatus 300 having the same or similar user information as user information of the electronic apparatus 100. Here, the user information may include an age, a gender, an occupation, preference, etc of the user of the electronic apparatus 100. In this case, the electronic apparatus 100 may further provide the user information of the electronic apparatus 100 to the application list providing server 200.

In operation S2340, the application list providing server 200 may provide the application list including the ID values of the selected applications to the electronic apparatus 100. Also, in operation S2350, the application list providing server 200 may provide power consumption of the selected applications.

In operation S2360, the electronic apparatus 100 may determine a power consumption grade of the application based on the received power consumption of the application. Since the embodiments of operation S730 of FIG. 7 or operation S1730 of FIG. 17 described above may be applied to a method, performed by the electronic apparatus 100, of determining a power consumption grade of an application, details thereof are not provided again.

In operation S2370, the electronic apparatus 100 may determine a graphic interface indicating the power consumption grade of the application. Since the embodiments of operation S1820 of FIG. 18 described above may be applied to a method, performed by the electronic apparatus 100, of determining a graphic interface, details thereof are not provided again.

In operation S2380, the electronic apparatus 100 may display the application list. Since the embodiments of FIGS. 19A through 19F described above may be applied to a method, performed by the electronic apparatus 100, of displaying an application list, details thereof are not provided again.

Meanwhile, in FIG. 22, the application list providing server 200 calculates power consumption of an application, but according to an embodiment, the electronic apparatus 100 may obtain componentwise power consumption of the application or taskwise power consumption of the application, and calculate the power consumption of the application based thereon. In this case, in operation S2350, the application list providing server 200 may provide componentwise power consumption of an application or taskwise power consumption of the application to the electronic apparatus 100.

Figure 24:
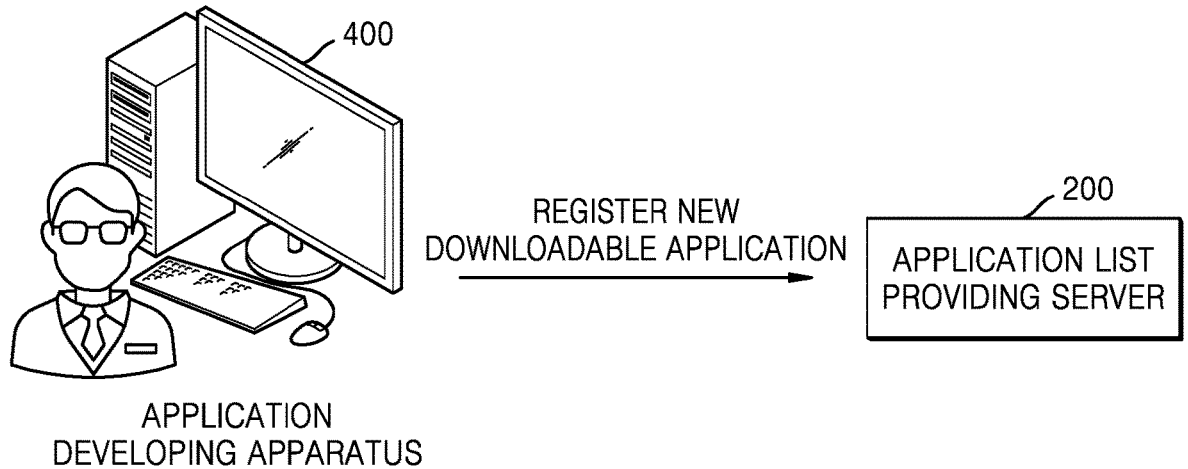
FIG. 24 is a schematic diagram of an application registering system according to some embodiments.

FIG. 24 is a schematic diagram of an application registering system according to some embodiments.

Referring to FIG. 24, the application registering system according to some embodiments may include the application list providing server 200 and an application developing apparatus 400.

The application list providing server 200 may be a cloud server that registers, from the application developing apparatus 400, an application downloadable by other electronic apparatuses (i.e., a downloadable application), and stores and/or manages information about the registered downloadable application. Here, information about a downloadable application may include application download information (for example, installation file location information or the like), an application name, a category, an icon, summary, etc, and in addition, may include a developer, a version, a review, etc.

The application list providing server 200 according to some embodiments may provide, to electronic apparatuses connecting to the application list providing server 200, an application list including ID values of downloadable applications and power consumption grades of the downloadable applications. Also, the application list providing server 200 may obtain power consumption of an application from electronic apparatuses where a downloadable application is installed. Also, the application list providing server 200 may receive feedback related to a power consumption grade of an application from electronic apparatuses where a downloadable application is installed.

The application developing apparatus 400 according to some embodiments may register a new downloadable application by connecting to the application list providing server 200. Also, the application developing apparatus 400 may provide information about the new downloadable application to the application list providing server 200.

The application developing apparatus 400 may be a PC, a tablet PC, a PDA, a laptop computer, a micro-server, a smart phone, or another mobile or non-mobile computing apparatus, but is not limited thereto. Also, the application developing apparatus 400 may include various apparatuses having a computing environment for developing an application.

Figure 25:
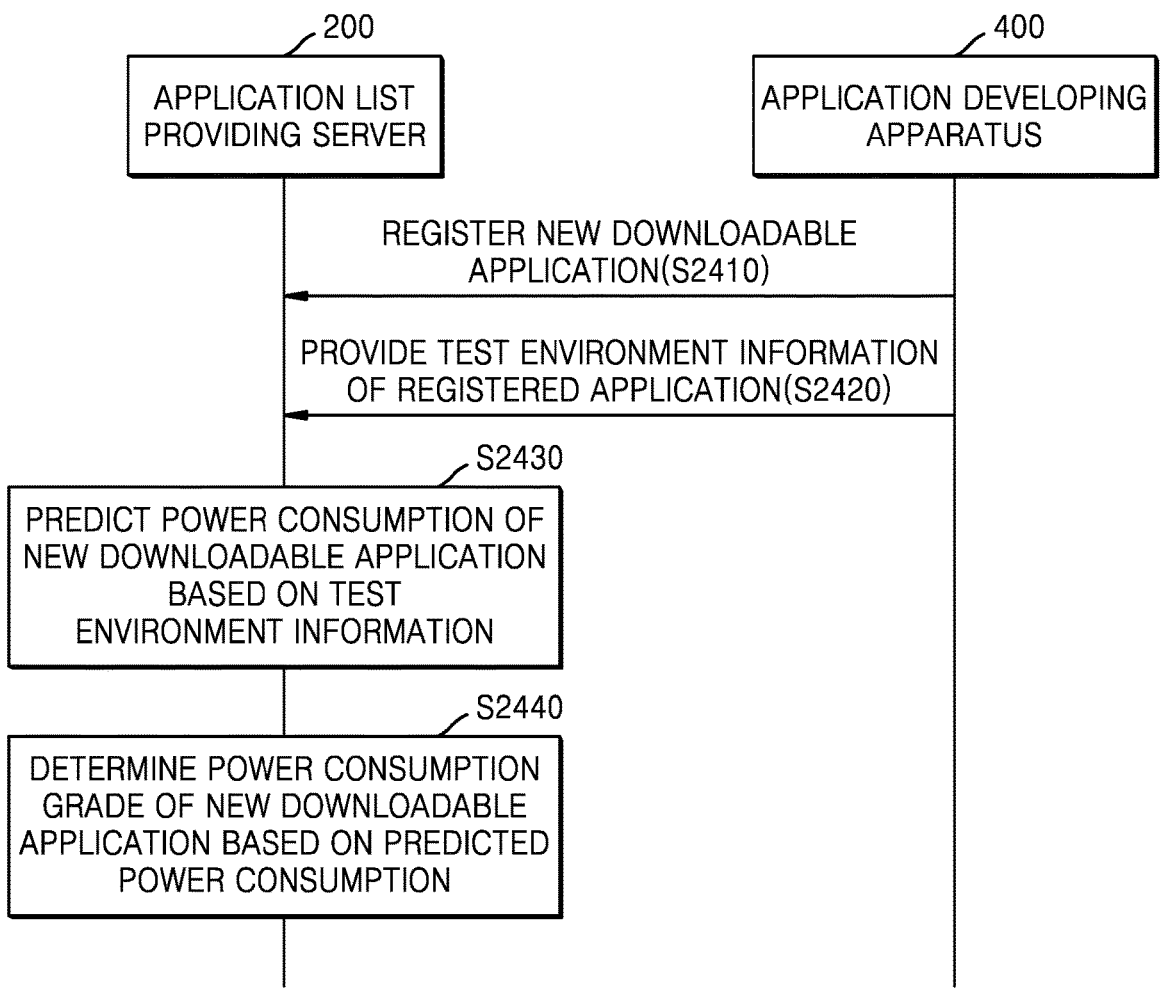
FIG. 25 is a diagram for describing an operating method of an application registering system, according to some embodiments.

FIG. 25 is a diagram for describing an operating method of an application registering system, according to some embodiments. In FIG. 25, a method, performed by the application list providing server 200, of predicting a power consumption grade of a new downloadable application as the new downloadable application is registered, according to some embodiments will be described.

In operation S2410, the application developing apparatus 400 may connect to the application list providing server 200 and register a new downloadable application.

In operation S2420, the application developing apparatus 400 may provide, to the application list providing server 200, test environment information of the registered application. Here, test environment information of an application may be workload information per component forming a computing environment where a downloadable application is tested. Alternatively, test environment information of an application may be simulated workload information per component when a downloadable application is tested on a simulator. For example, test environment information of an application may include a workload (for example, n cycles or the like) of a downloadable application in a virtual CPU, a workload of the downloadable application in a virtual GPU, a workload of the downloadable application in a virtual memory, etc.

In operation S2430, the application list providing server 200 may predict power consumption of the new downloadable application based on the test environment information provided from the application developing apparatus 400. For example, the application list providing server 200 may predict the power consumption of the new downloadable application based on a workload per component (or simulated component). For example, the application list providing server 200 may predict the power consumption of the new downloadable application according to power consumption per pre-set unit workload.

In operation S2440, the application list providing server 200 may determine a power consumption grade of the new downloadable application based on the predicted power consumption.

Meanwhile, the embodiments of operations S2430 to S2440 may be applied when the application list providing server 200 provides an application list including the downloadable application registered in operation S2410 to an electronic apparatus. Also, the embodiments of operations S2430 to S2440 may be applied when there is no another electronic apparatus that installed the downloadable application registered in operation S2410. When there is another electronic apparatus that installed the downloadable application registered in operation S2410, the application list providing server 200 may determine the power consumption grade based on power consumption of the downloadable application obtained from the other electronic apparatus.

Figure 26:
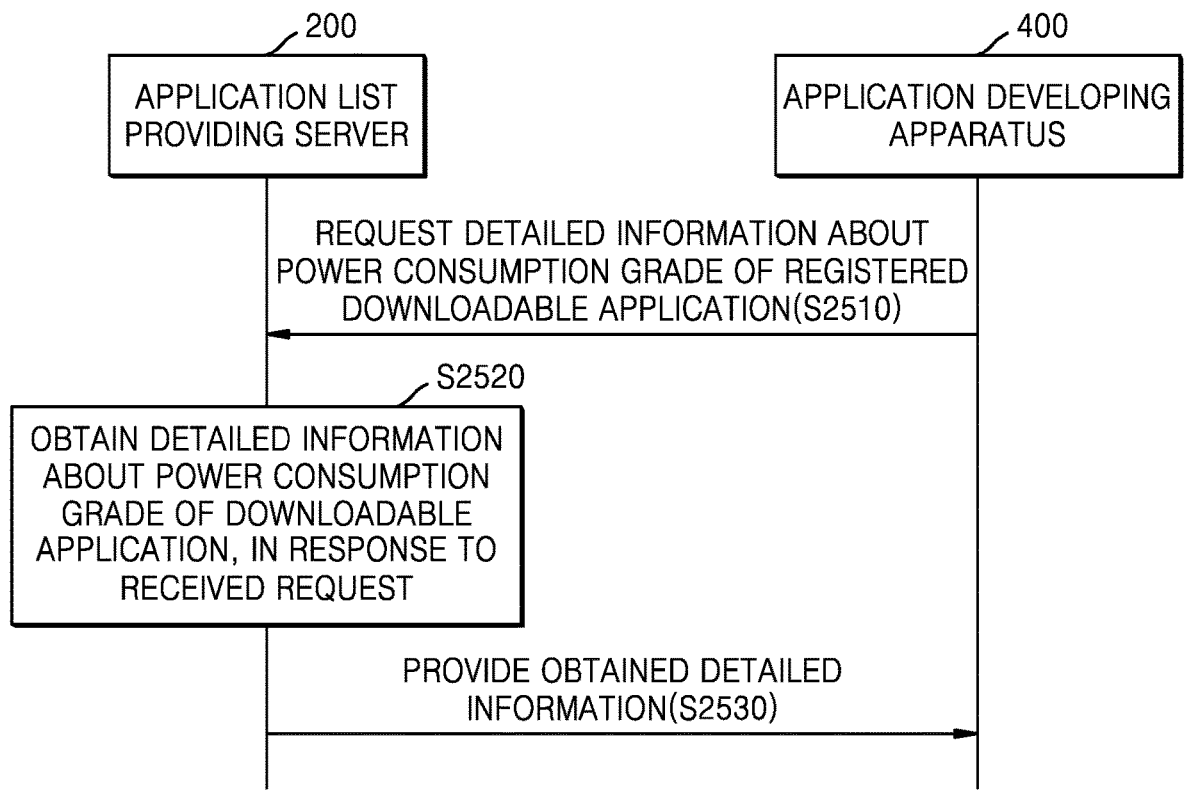
FIG. 26 is a diagram for describing a method, performed by an application list providing server, of providing detailed information related to a power consumption grade of an application to an application developing apparatus, according to some embodiments.

FIG. 26 is a diagram for describing a method, performed by an application list providing server, of providing detailed information related to power consumption grade of an application to an application developing apparatus, according to some embodiments.

In operation S2510, the application developing apparatus 400 may request the application list providing server 200 for detailed information about a power consumption grade of a downloadable application registered by the application developing apparatus 400.

In operation S2520, the application list providing server 200 may obtain the detailed information about the power consumption grade of the downloadable application registered by the application developing apparatus 400, in response to the received request. For example, the application list providing server 200 may obtain power consumption grade comparison information of different components of a downloadable application, power consumption grade comparison information of different devices, power consumption grade comparison information of different OSs, power consumption grade comparison information of user information, and power consumption grade comparison information of versions.

In operation S2530, the application list providing server 200 may transmit the obtained detailed information to the application developing apparatus 400.

As such, the application list providing server 200 according to some embodiments may enable a developer of an application to develop a low-power application by providing information related to power consumption of an application to the application developing apparatus 400.

Figure 27:
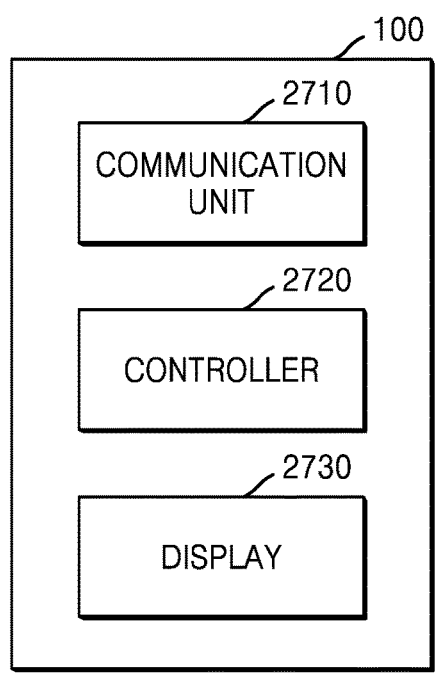
FIGS. 27 and 28 are diagrams of a configuration of an electronic apparatus, according to some embodiments.
Figure 28:
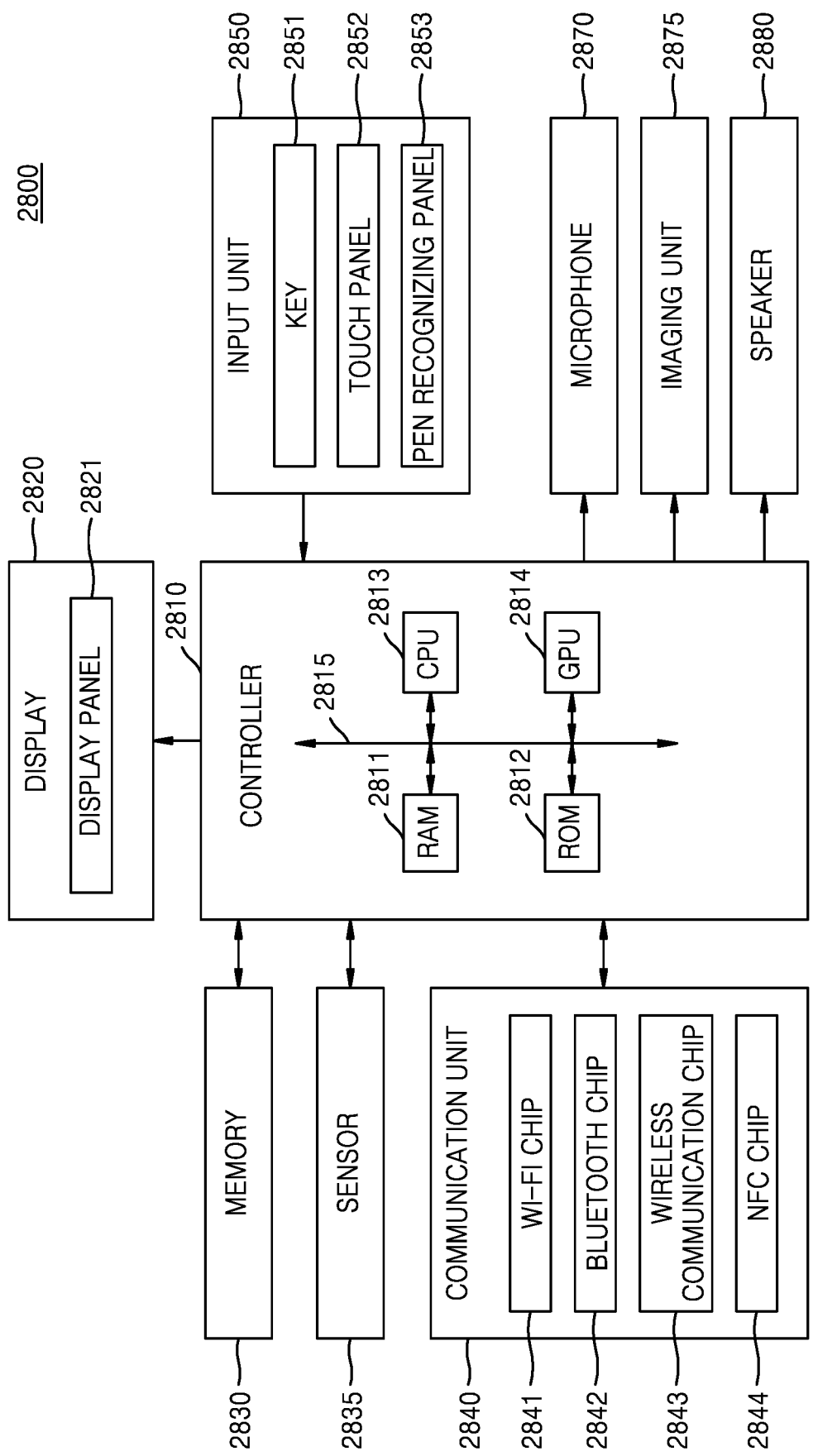

FIGS. 27 and 28 are diagrams of a configuration of an electronic apparatus, according to some embodiments.

As shown in FIG. 27, the electronic apparatus 100 according to some embodiments includes a communication unit 2710, a controller 2720, and a display 2730. However, components shown in FIG. 27 are not all essential components.

An electronic apparatus may be realized by more than those shown in FIG. 27 or less than those shown in FIG. 27.

For example, as shown in FIG. 28, an electronic apparatus 2800 according to some embodiments may further include a memory 2830, a sensor 2835, an input unit 2850, a microphone 2870, an imaging unit 2875, and a speaker 2880, in addition to a communication unit 2840, a controller 2810, and a display 2820 respectively corresponding to the communication unit 2710, the controller 2720, and the display 2730 of FIG. 27.

Also, the electronic apparatus 2800 according to some embodiments may include the same structural features and technical ideas as the operation method of the electronic apparatus 2800 according to embodiments described with reference to FIGS. 1 through 26. Accordingly, details that overlap those of FIGS. 1 through 26 are not provided again.

The controller 2810 may generally control overall operations of the electronic apparatus 2800. For example, the controller 2810 may generally control the display 2820, the communication unit 2840, the sensor 2835, the input unit 2850, the microphone 2870, the imaging unit 2875, the speaker 2880, etc.

According to some embodiments, the controller 2810 may control the display 2820 to display an application list on a screen.

Also, the controller 2810 may determine a graphic interface indicating power consumption grades of applications in the application list. In detail, the controller 2810 may determine the graphic interface indicating the power consumption grades based on the power consumption grades of the applications received from the application list providing server 200 through the communication unit 2840. Since an operation of the controller 2810 determining the graphic interface corresponds to operation S1820 of FIG. 18, details thereof are not provided again.

Alternatively, the controller 2810 may determine the power consumption grades of the applications based on power consumption of the applications received from the application list providing server 200 through the communication unit 2840, and determine the graphic interface based on the determined power consumption grades. Since an operation of the controller 2810 determining the power consumption grades of the applications corresponds to operation S2360 of FIG. 23, details thereof are not provided again.

Meanwhile, the graphic interface may include at least one of an image, text, and an animation distinguished according to the power consumption grades of the applications. Alternatively, the controller 2810 may determine at least one of a color, brightness, and chroma of an object indicating an ID value of the application in the application list, based on the power consumption grade of the application. Alternatively, the controller 2810 may determine a size of an object indicating an ID value of the application in the application list, based on the power consumption grade of the application.

Also, upon receiving a user input of selecting the graphic interface in the application list, the controller 2810 may control the display 2820 to display detailed information about the power consumption grade of the application on the screen.

Meanwhile, the controller 2810 may include at least one of a random access memory (RAM) 2811, a read-only memory (ROM) 2812, a CPU 2813, a GPU 2814, and a bus 2815. The RAM 2811, the ROM 2812, the CPU 2813, and the GPU 2814 may be connected to each other through the bus 2815.

The CPU 2813 performs booting by using an OS stored in the memory 2830 by accessing the memory 2830. Then, the CPU 2813 performs various operations by using various programs, content, data, etc. stored in the memory 2830.

An instruction set or the like for system booting is stored in the ROM 2812. For example, when power is supplied as a turn-on command is input, the electronic apparatus 2800 may copy the OS stored in the memory 2830 according to an instruction stored in the ROM 2812 to the RAM 2811, and boot a system by executing the OS. When the booting is completed, the CPU 2813 may copy the various programs stored in the memory 2830 to the RAM 2811, and perform various operations by executing the programs copied to the RAM 2811. When the booting of the electronic apparatus 2800 is completed, the GPU 2814 displays a user interface (UI) screen in a region of the display 2820. Also, a screen generated by the GPU 2814 may be provided to the display 2820 to be displayed in each region of the display 2820.

The display 2820 may display information processed by the electronic apparatus 2800, according to control of the controller 2810.

According to some embodiments, the display 2820 may display the application list according to control of the controller 2810. In detail, the display 2820 may display the application list including the graphic interface indicating the power consumption grade of the application, according to control of the controller 2810.

Also, the display 2820 may display the detailed information about the power consumption grade of the application, according to control of the controller 2810. Since a method, performed by the display 2820, of displaying the detailed information about the power consumption grade corresponds to operation S2010 of FIG. 20, details thereof are not provided again.

The display 2820 may include a display panel 2821 and a controller (not shown) controlling the display panel 2821. The display panel 2821 may be embodied in any one of various types of display, such as a liquid crystal display (LCD), an organic light-emitting diode (OLED) display, an active-matrix organic light-emitting diode (AM-OLED), a plasma display panel (PDP), etc. The display panel 2821 may be flexible, transparent, or wearable. The display 2820 may be provided as a touch screen (not shown) by being combined to a touch panel 2852 of the input unit 2850. For example, the touch screen (not shown) may include an integrated module in which the display panel 2821 and the touch panel 2852 are combined in a stacked structure. Also, the touch screen may further include a pressure type sensor at a part of the integrated module in which the display panel 2821 and the touch panel 2852 are combined in the stacked structure.

The memory 2830 may include at least one of an internal memory (not shown) and an external memory (not shown).

The internal memory may include at least one of, for example, a volatile memory (for example, dynamic RAM (DRAM), static RAM (SRAM), synchronous dynamic RAM (SDRAM), or the like), a nonvolatile memory (for example, one time programmable ROM (OTPROM), programmable ROM (PROM), erasable and programmable ROM (EPROM), electrically erasable and programmable ROM (EEPROM), mask ROM, flash ROM, or the like), a hard disk drive (HDD), and a solid state drive (SSD).

According to an embodiment, the controller 2810 may load, onto a volatile memory, and process a command or data received from at least one of a nonvolatile memory and another component. Also, the controller 2810 may store data received from or generated by another component in a nonvolatile memory.

The external memory may include, for example, at least one of compact flash (CF), secure digital (SD) card, a micro-SD card, a mini-SD card, an extreme digital (xD) card, and a memory stick.

The memory 2830 may store various programs and data used for operations of the electronic apparatus 2800. For example, the memory 2830 may temporarily or semi-permanently store at least a part of content to be displayed on a lock screen.

The communication nit 2840 may include one or more components that enable the electronic apparatus 2800 to communicate with the application list providing server 200 or an external electronic apparatus. For example, the communication unit 2840 may include at least one of a Wi-Fi chip 2841, a Bluetooth chip 2842, a wireless communication chip 2843, and a near field communication (NFC) chip 2844. The controller 2810 may exchange data with various external devices by using the communication unit 2840.

According to some embodiments, the communication unit 2840 may request the application list providing server 200 for the application list. Also, the communication unit 2840 may receive, from the application list providing server 200, the application list including information about the power consumption grade of the application and the ID value of the application.

Alternatively, the communication unit 2840 may receive the power consumption of the application from the application list providing server 200, or may receive componentwise power consumption of the application or taskwise power consumption of the application.

Meanwhile, the Wi-Fi chip 2841 and the Bluetooth chip 2842 may perform communication respectively via Wi-Fi and a Bluetooth. When the Wi-Fi chip 2841 or the Bluetooth chip 2842 is used, various pieces of connection information, such as SSID and a session key, are first exchanged, and then various types of information may be exchanged after communication connection using the connection information.

The wireless communication chip 2843 denotes a chip that performs communication according to various communication standards, such as IEEE, Zigbee, $3^{rd}$ generation (3G), $3^{rd}$ generation partnership project (3GPP), long term evolution (LTE), etc. The NFC chip 2844 denotes a chip operating in an NFC manner using 13.56 MHz band from among various RF-ID frequency bands, such as 135 kHz, 13.56 MHz, 433 MHz, 860 to 960 MHz, 2.45 GHz, etc.

The input unit 2850 may receive various instructions from a user. The input unit 2850 may include at least one of a key 2851, the touch panel 2852, and a pen-recognizing panel 2853.

According to some embodiments, the input unit 2850 may receive the user input with respect to the graphic interface in the application list.

The touch panel 2852 may detect a touch input of the user, and output a touch event value corresponding to a detected touch signal. According to an embodiment, the touch panel 2852 may receive a touch input including at least one of tapping, touching-and-holding, double-tapping, dragging, panning, flicking, and dragging-and-dropping of the user. When a touch screen (not shown) is formed as the touch panel 2852 and the display panel 2821 are combined, the touch screen may include any type of touch sensor, such as an electrostatic type, a pressure type, and a piezoelectric type.

In the electrostatic type, a dielectric material coated on a surface of the touch screen is used to detect micro-electricity induced by the user when a body of the user touches the screen, and a touched coordinate is calculated. In the pressure type, the touch screen includes two electrode plates, and when the user touches the touch screen, a touched coordinate is calculated by detecting a current flowing through the two electrode plates as the two electrode plates touch each other at a touched point. A touch event generated on the touch screen may be mainly generated by a finger of the user, but may alternatively generated by a conductive object that may apply capacitance change to the touch screen.

The key 2851 may include various types of keys, such as a mechanical button and a wheel, which are formed on various outer regions of a body of the electronic apparatus 2800, such as a front region, a side region, and a rear region.

The pen recognizing panel 2853 may detect a proximity input or a touch input of a touch pen, such as a stylus pen or a digitizer pen, and output a pen proximity event or a pen touch event. The pen recognizing panel 2853 may use, for example, an electromagnetic resonance (EMR) method, and may detect a touch input or a proximity input according to a change of intensity of an electromagnetic field, which is caused as the pen approaches or touches the input unit 2850. In detail, the pen recognizing panel 2853 may include an electron inducing coil sensor (not shown) having a grid structure, and an electron signal processor (not shown) providing an alternating signal having a certain frequency sequentially to each loop coil of the electron inducing coil sensor. When a pen including a resonance circuit is located near the loop coil of the pen recognizing panel 2853, a magnetic field transmitted from the loop coil generates a current based on mutual electron induction in the resonance circuit. An induction magnetic field is generated from a coil forming the resonance circuit based on the current, and the pen recognizing panel 2853 detects a proximity or touch location of the pen by detecting the induction magnetic field from the loop coil in a signal receiving state. The pen recognizing panel 2853 may have a certain area below the display panel 2821, for example, an area capable of covering a display region of the display panel 2821.

The microphone 2870 may receive user's voice or other sound and convert the user's voice or other sound to audio data. The controller 2810 may use the user's voice for a phone call operation, or convert the user's voice to audio data and store the audio data in the memory 2830.

The imaging unit 2875 may capture a still image or a moving image according to control of the user. A plurality of the imaging unit 2875 may be used, such as a front camera and a rear camera.

When the imaging unit 2875 and the microphone 2870 are provided, the controller 2810 may perform a control operation according to user's voice input through the microphone 2870 or user's motion recognized by the imaging unit 2875. For example, the electronic apparatus 2800 may operate in a motion control mode or a voice control mode. In the motion control mode, the controller 2810 activates the imaging unit 2875 to capture the user, and performs a control operation corresponding to a motion change of the user. In the voice control mode, the controller 2810 may analyze the user's voice input through the microphone 2870, and perform a control operation according to the analyzed user's voice.

The speaker 2880 may output audio data according to control of the controller 2810. According to some embodiments, upon receiving, through the input unit 2850, a user input of selecting an application in the application list, the speaker 2880 may output notification sound distinguished according to power consumption grades of the selected application.

Although not shown in FIG. 26, according to an embodiment, the electronic apparatus 2800 may further include a universal serial bus (USB) port to which a USB connector is connected, various external input ports to which various external terminals, such as a headset, a mouse, an LAN are connected, a digital multimedia broadcasting (DMB) chip that receives and processes a DMB signal, and various sensors.

Also, the electronic apparatus 2800 may further include a vibrator (not shown) for vibrating the electronic apparatus 2800. According to some embodiments, the electronic apparatus 2800 may further include the vibrator (not shown) that outputs vibration distinguished according to power consumption grades of the selected application when the user input of selecting the application in the application list is received through the input unit 2850.

Figure 29:
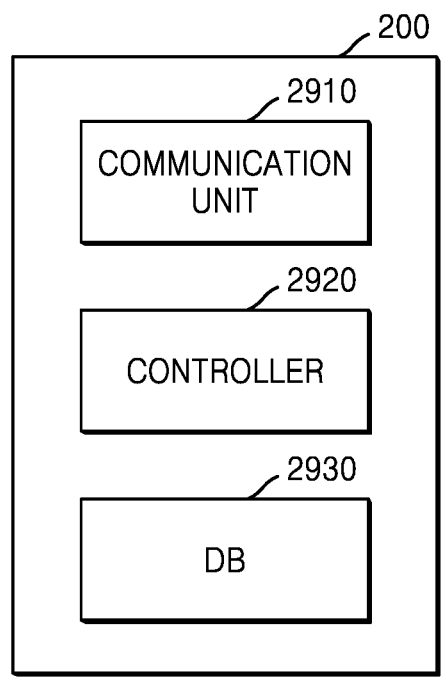
FIG. 29 is a diagram of a configuration of a server, according to some embodiments.

Also, names of the components of the electronic apparatus 2800 described above may be changed according to embodiments FIG. 29 is a diagram of a configuration of a server, according to some embodiments.

Referring to FIG. 28, the application list providing server 200 includes a communication unit 2910, a controller 2920, and a database (DB) 2930. However, not all illustrated components are essential components, and the application list providing server may be realized by more than those shown in FIG. 28 or less than those shown in FIG. 28.

Also, the application list providing server 200 according to some embodiments may include the same structural features and technical ideas as the operation method of the application list providing server 200 according to embodiments described with reference to FIGS. 1 through 26. Accordingly, details that overlap those of FIGS. 1 through 26 are not provided again.

The communication unit 2910 may include one or more components that enable the application list providing server 200 to communicate with external apparatuses. For example, the communication unit 2910 may include at least one of Wi-Fi chip (not shown), a Bluetooth chip (not shown), a wireless communication chip (not shown), and an NFC chip (not shown).

According to some embodiments, the communication unit 2910 may receive a request to provide an application list from the electronic apparatus 100. Also, the communication unit 2910 may receive device information (for example, a product name or model name of the electronic apparatus 100) of the electronic apparatus 100 from the electronic apparatus 100. Also, the communication unit 2910 may receive user information of the electronic apparatus 100 from the electronic apparatus 100. Also, the communication unit 2910 may receive estimated usage time information of an application from the electronic apparatus 100.

Also, the communication unit 2910 may receive power consumption of an application from the other electronic apparatus 300 where the application registered in the application list providing server 200 is installed. Also, the communication unit 2910 may receive device information (for example, a product name or model name of the other electronic apparatus 300) of the other electronic apparatus 300 from the other electronic apparatus 300. Also, the communication unit 2910 may receive, from the other electronic apparatus 300, power consumption changing information of the application according to time. Also, the communication unit 2910 may receive user information of the other electronic apparatus 300.

Also, the communication unit 2910 may transmit, to the controller 2920, a request and/or information received from the electronic apparatus 100 and the other electronic apparatus 300.

Also, the communication unit 2910 may transmit, to the electronic apparatus 100, an application list including an ID value of an application, according to control of the controller 2920. Also, the communication unit 2910 may transmit, to the electronic apparatus 100, the application list including a power consumption grade of the application. Also, the communication unit 2910 may transmit, to the electronic apparatus 100, the application list including a graphic interface indicating the power consumption grade of the application.

Also, the communication unit 2910 may transmit the power consumption of the application to the electronic apparatus 100. For example, the communication unit 2910 may transmit, to the electronic apparatus 100, total power consumption of the application determined based on componentwise power consumption of the application or taskwise power consumption of the application. Alternatively, the communication unit 2910 may transmit, to the electronic apparatus 100, the componentwise power consumption of the application or the taskwise power consumption of the application.

Also, the communication unit 2910 may receive, from the application developing apparatus 400, information about an application downloadable by other electronic apparatuses. For example, the communication unit 2910 may receive, from the application developing apparatus 400, application download information (for example, an installation file location information or the like), and information about an application name, a category, an icon, a summary, a version, a review, etc.

Also, the communication unit 2910 may provide, to the application developing apparatus 400, detailed information about the power consumption grade of the application.

The controller 2920 may control overall operations of the application list providing server 200. For example, the controller 2920 may generally control the communication unit 2910 and the DB 2930.

The controller 2920 according to some embodiments may select applications to be included in the application list, in response to the request to provide the application list received from the electronic apparatus 100 through the communication unit 2910. Here, the selected applications may be downloadable applications registered in the application list providing server 200 by the application developing apparatus 400.

According to some embodiments, the controller 2920 may determine the power consumption grade of the application in the application list based on the power consumption of the application received from the other electronic apparatus 300 through the communication unit 2910.

Here, the power consumption grade of the application may be total power consumption determined based on the componentwise power consumption of the application. The controller 2920 may assign a weight per component, and calculate the power consumption of the application based on the weight. Also, the controller 2920 may determine the power consumption grade of the application based on the calculated power consumption. For example, the controller 2920 may assign a large weight to components included in the electronic apparatus 100. Since an operation of the controller 2920 determining a power consumption grade by assigning a weight per component corresponds to operations S710 to S730 of FIG. 7, details thereof are not provided again.

Alternatively, the power consumption grade of the application may be total power consumption determined based on the taskwise power consumption of the application. For example, the controller 2920 may assign a weight per task of the application, and calculate the power consumption of the application based on the weight. Since an operation of the controller 2920 determining a power consumption grade by assigning a weight per task corresponds to operations S1710 to S1730 of FIG. 17, details thereof are not provided again.

Alternatively, the controller 2920 may determine the power consumption grade of the application based on the power consumption pre pre-set application.

According to some embodiments, the controller 2920 may determine the power consumption grade of the application based on power consumption of the application obtained from the other electronic apparatus 300 having the same product name or model name as the electronic apparatus 100.

Alternatively, the controller 2920 may determine a power consumption grade according to power consumption for an estimated usage time of the application from among the amounts of power consumption of the application received from the other electronic apparatus 300, based on the estimated usage time of the application received from the electronic apparatus 100.

Alternatively, the controller 2920 may determine a power consumption grade of the application based on power consumption of the application received from the other electronic apparatus 300 having the same or similar user information as the user information of the electronic apparatus 100.

Also, the controller 2920 may register and manage information about applications downloadable by other electronic apparatuses, the information received from the application developing apparatus 400. For example, upon receiving the request to provide the application list from the electronic apparatus 100, the controller 2920 may select an application to be included in the application list based on information about the registered applications.

The DB 2930 may store information required to provide a service of the application list providing server 200.

According to some embodiments, the DB 2930 may store information about an application developer who registered applications downloadable by other electronic apparatuses. Also, the DB 2930 may store information (for example, an application installation file information, an application name, etc.) about the applications downloadable by the other electronic apparatuses.

Also, the DB 2930 may store power consumption of an application obtained from the other electronic apparatus 300 where the application is installed, through the application list providing server 200. For example, the DB 2930 may store power consumption of the application per component. Alternatively, the DB 2930 may store the power consumption of the application per component and user information. Alternatively, the DB 2930 may store a graph with respect to power consumption according to usage time of the application. However, an embodiment is not limited thereto, and the power consumption of the application may be stored and/or managed via various methods.

Also, names of components of the application list providing server 200 described above may vary according to embodiments.

The embodiments may be written as computer programs and may be implemented in general-use digital computers that execute the programs using a non-transitory computer-readable recording medium.

Also, when a communication with a remote computer or server is required by a processor of a computer to execute the above-described functions, the processor of the computer may further include information about how the communication is performed with the remote computer or server by using a communication module (for example, a wired and/or wireless communication module) of the computer, and about information or media to be exchanged during the communication.

Also, functional programs, codes, and code segments for accomplishing the present disclosure may be easily construed by programmers skilled in the art to which the present disclosure pertains, considering system environments of a computer executing a program by reading the non-transitory recording medium.

Examples of the non-transitory computer-readable recording medium include magnetic storage media (e.g., ROM, floppy disks, hard disks, etc.), optical recording media (e.g., CD-ROMs, or DVDs), etc.

Also, the non-transitory computer-readable recording medium may also be distributed over network coupled computer systems so that the computer-readable code is stored and executed in a distributed fashion. Here, at least one of a plurality of distributed computers may perform some of the above-described functions and transmit execution results to the remaining at least one of the plurality of distributed computers, and the remaining at least one of the plurality of distributed computers may perform some of the above-described functions to provide execution results to the at least one of the plurality of distributed computers.

Hereinabove, all components according to the embodiments are described to be combined as one or are described to operate by being combined with each other, but an embodiment is not limited thereto. In other words, at least two of the components may selectively combine to operate within the scopes of the present disclosure. Also, the components may each be realized as independent hardware, or some or all of the components may be selectively combined to be realized as a computer program having a program module in which some or all functions are performed in one or more pieces of hardware.

All terms (including technical and scientific terms) used herein have the same meanings as commonly understood by one of ordinary skill in the art to which this invention belongs. It will be further understood that terms such as those defined in commonly used dictionaries should be interpreted as having meanings that are consistent with their meanings in the context of the relevant art and will not be interpreted in an idealized or overly formal sense unless expressly so defined herein.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

The invention claimed is:

1. A method, performed by an electronic apparatus, of displaying an application list, the method comprising:
providing, to a server, device information of the electronic apparatus;
requesting the server for an application list comprising an identification value of at least one application downloadable by the electronic apparatus, wherein the requesting the server for the application list comprises providing user information of the electronic apparatus and the user information comprises at least one of an age, a gender, or an occupation of a user;
receiving, from the server, the application list comprising a graphic interface indicating a power consumption grade of the at least one application; and
displaying the application list,
wherein the power consumption grade of the at least one application is determined based on power consumption information of the at least one application obtained by the server from each of a plurality of other electronic apparatuses executing the at least one application,
wherein the plurality of other electronic apparatuses is identified based on the device information and the user information,
wherein the power consumption grade of the at least one application is a relative grade determined by comparing amount of power consumption of the plurality of applications in the application list,
wherein an amount of power consumption of each application is calculated by adding component-wise power consumption of the each application to which a weight is assigned, the weight is assigned based on a performance of a component, and
wherein the power consumption information of the at least one application obtained from each respective one of the plurality of other electronic apparatuses comprises foreground power consumption information for executing of the at least one application in a foreground of the respective other electronic apparatus and background power consumption information for executing of the at least one application in a background of the respective other electronic apparatus.

2. The method of claim 1,
wherein the power consumption information of the at least one application comprises total power consumption determined based on power consumption consumed per component included in the other electronic apparatuses to execute the at least one application.

3. The method of claim 2, wherein the power consumption information of the at least one application is determined based on at least one of power consumed by a central processing unit (CPU), power consumed by a graphic processing unit (GPU), power consumed by a memory, or power consumed during a network communication process of the other electronic apparatuses to execute the at least one application.

4. The method of claim 2, wherein the other electronic apparatuses are a same product model as the electronic apparatus.

5. The method of claim 2, wherein the requesting the server for the application list further comprises providing, to the server, information about an application estimated usage time,
wherein the power consumption grade of the at least one application is determined based on power consumption of the at least one application for the application estimated usage time.

6. The method of claim 5, wherein users of the other electronic apparatuses have same or similar user information as the user of the electronic apparatus.

7. The method of claim 1, wherein the graphic interface comprises at least one of an image, text, or animation distinguished based on the power consumption grade of the at least one application.

8. The method of claim 1, wherein the graphic interface determines at least one of a color, brightness, chroma, or size of an object indicating the identification value of the at least one application in the application list, based on the power consumption grade of the at least one application.

9. An electronic apparatus comprising:
at least one processor configured to:
control to provide, to a server, device information of the electronic apparatus;
control to request the server for an application list comprising an identification value of at least one application downloadable by the electronic apparatus, wherein the request to the server for the application list comprises user information of the electronic apparatus and the user information comprises at least one of an age, a gender, or an occupation of a user;
control to receive, from the server, the application list comprising a graphic interface indicating a power consumption grade of the at least one application; and
control to display the application list on a screen,
wherein the power consumption grade of the at least one application is determined based on power consumption information of the at least one application obtained by the server from each of a plurality of other electronic apparatuses in which the at least one application is pre-installed and which is executing the at least one application, wherein the plurality of other electronic apparatuses is identified based on the device information and the user information, wherein the power consumption grade of the at least one application is a relative grade determined by comparing amount of power consumption of the plurality of applications in the application list, wherein an amount of power consumption of each application is calculated by adding component-wise power consumption of the each application to which a weight is assigned, the weight is assigned based on a performance of a component, and wherein the power consumption information of the at least one application obtained from each respective one of the plurality of other electronic apparatuses comprises foreground power consumption information for executing of the at least one application in a foreground of the respective other electronic apparatus and background power consumption information for executing of the at least one application in a background of the respective other electronic apparatus.

10. The electronic apparatus of claim 9, wherein the at least one processor is further configured to control to transmit, to the server, a product model of the electronic apparatus, wherein the power consumption of the at least one application is total power consumption determined based on power consumed per component included in the other electronic apparatuses to execute the at least one application.

11. The electronic apparatus of claim 10, wherein the other electronic apparatuses are a same product model as the electronic apparatus.

12. The electronic apparatus of claim 9, wherein the graphic interface comprises at least one of an image, text, or animation distinguished based on the power consumption grade of the at least one application, and the at least one processor is further configured to determine at least one of a color, brightness, chroma, or a size of an object indicating the identification value of the at least one application in the application list based on the power consumption grade of the at least one application.

13. A non-transitory computer-recording medium having recorded thereon a program which, when executed by a computer, of an electronic apparatus, causes the computer to control the electronic apparatus to:

provide, to a server, device information of the electronic apparatus;

request the server for an application list comprising an identification value of at least one application downloadable by the electronic apparatus, wherein the requesting the server for the application list comprises providing user information of the electronic apparatus and the user information comprises at least one of an age, a gender, or an occupation of a user;

receive, from the server, the application list comprising a graphic interface indicating a power consumption grade of the at least one application; and display the application list, wherein the power consumption grade of the at least one application is determined based on power consumption information of the at least one application obtained by the server from each of a plurality of other electronic apparatuses in which the at least one application is pre-installed and which is executing the at least one application, wherein the plurality of other electronic apparatuses is identified based on the device information and the user information, wherein the power consumption grade of the at least one application is a relative grade determined by comparing amount of power consumption of the plurality of applications in the application list, wherein an amount of power consumption of each application is calculated by adding component-wise power consumption of the each application to which a weight is assigned, the weight is assigned based on a performance of a component, and wherein the power consumption information of the at least one application obtained from each respective one of the plurality of other electronic apparatuses comprises foreground power consumption information for executing of the at least one application in a foreground of the respective other electronic apparatus and background power consumption information for executing of the at least one application in a background of the respective other electronic apparatus.

* * * * *